(12) United States Patent
Xu et al.

(10) Patent No.: US 12,526,127 B2
(45) Date of Patent: Jan. 13, 2026

(54) RESOURCE DISTRIBUTION METHOD AND APPARATUS

(71) Applicants: Beijing BOE Technology Development Co., Ltd., Beijing (CN); BOE Technology Group Co., Ltd., Beijing (CN)

(72) Inventors: Lirong Xu, Beijing (CN); Haitao Zheng, Beijing (CN); Xinyin Wu, Beijing (CN); Honglei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 139 days.

(21) Appl. No.: 18/558,706

(22) PCT Filed: Aug. 31, 2022

(86) PCT No.: PCT/CN2022/116239
§ 371 (c)(1),
(2) Date: Nov. 2, 2023

(87) PCT Pub. No.: WO2024/045053
PCT Pub. Date: Mar. 7, 2024

(65) Prior Publication Data
US 2025/0106002 A1 Mar. 27, 2025

(51) Int. Cl.
*H04L 9/06* (2006.01)
*H04L 9/00* (2022.01)

(52) U.S. Cl.
CPC .............. *H04L 9/0618* (2013.01); *H04L 9/50* (2022.05)

(58) Field of Classification Search
None
See application file for complete search history.

(56) References Cited

U.S. PATENT DOCUMENTS 10,535,062 B1 * 1/2020 Rule .................. G06Q 20/4014
11,188,612 B2 * 11/2021 Shao .................. G06F 16/9577
(Continued)

FOREIGN PATENT DOCUMENTS

| CN | 109961292 A | 7/2019 |
| CN | 110390183 A | 10/2019 |

(Continued)

OTHER PUBLICATIONS

Imba_Bill. "Application of video applications on the blockchain." Nov. 11, 2018. Retrieved from https://blog.csdn.net/weixin_43668031/article/details/83962959.

(Continued)

*Primary Examiner* — Bassam A Noaman
(74) *Attorney, Agent, or Firm* — IPro, PLLC

(57) ABSTRACT

A resource distribution method and apparatus. The method is applied to a first server side, including: in response to a resource acquisition request initiated by a first consumer terminal for a target resource, obtaining, from a blockchain network, pre-acquisition information corresponding to the resource acquisition request; when the obtained pre-acquisition information indicates that there is a resource pre-acquisition transaction corresponding to the first consumer terminal and the target resource stored in a blockchain ledger of the blockchain network, returning the target resource to the first consumer terminal. This method can achieve reliable certification of resource distribution records by executing transactions. Based on transactions stored in the blockchain, the distribution process of target resources can be traced, thereby improving the control of target resources and (Continued)

reducing the security risks and infringement hazards of the resource distribution process to a certain extent.

18 Claims, 7 Drawing Sheets

(56) References Cited

U.S. PATENT DOCUMENTS

| | | | | |
|---|---|---|---|---|
| 2017/0230349 | A1* | 8/2017 | Gaur | G06F 21/629 |
| 2018/0183606 | A1* | 6/2018 | High | H04L 9/3239 |
| 2019/0342077 | A1* | 11/2019 | McMurdie | H04L 63/123 |
| 2020/0226679 | A1 | 7/2020 | Li et al. | |
| 2021/0042748 | A1 | 2/2021 | Sepulveda et al. | |
| 2021/0158335 | A1* | 5/2021 | Bollen | G06Q 20/02 |
| 2021/0334268 | A1* | 10/2021 | Zhang | H04L 63/12 |
| 2021/0342830 | A1* | 11/2021 | Ferenczi | G06Q 20/401 |
| 2022/0052988 | A1* | 2/2022 | Gadnis | H04L 63/0464 |
| 2023/0029053 | A1* | 1/2023 | Manuel-Devadoss | H04L 9/0825 |
| 2023/0177084 | A1 | 6/2023 | Jiang et al. | |
| 2023/0237198 | A1* | 7/2023 | Bonda | G06F 21/64 711/154 |
| 2024/0028599 | A1* | 1/2024 | Aurongzeb | G06F 16/24575 |

FOREIGN PATENT DOCUMENTS

| | | |
|---|---|---|
| CN | 111741268 A | 10/2020 |
| CN | 112272181 A | 1/2021 |
| CN | 111737522 B | 3/2021 |
| CN | 112818414 A | 5/2021 |
| CN | 112905836 A | 6/2021 |
| CN | 110602515 B | 8/2021 |
| CN | 113392430 A | 9/2021 |
| CN | 113518260 A | 10/2021 |
| CN | 113821817 A | 12/2021 |
| CN | 113259590 B | 2/2022 |
| WO | 2020248603 A1 | 12/2020 |

OTHER PUBLICATIONS

PCT/CN2022/116239 international search report.
PCT/CN2022/116239 Written Opinion.

* cited by examiner

RESOURCE DISTRIBUTION METHOD AND APPARATUS

CROSS-REFERENCE TO RELATED APPLICATIONS

The present application is a U.S. National Phase of International Application No. PCT/CN2022/116239, filed Aug. 31, 2022, the entire contents of which are hereby incorporated by reference for all purposes.

TECHNICAL FIELD

The present disclosure relates to the field of blockchain technology, and more particularly, to a resource distribution method and a resource distribution apparatus.

BACKGROUND

Blockchain is a new application mode of computer technology such as distributed data storage, peer-to-peer transmission, consensus mechanism, and encryption algorithms. In a blockchain system, data blocks are sequentially connected in chronological order to form a chain like data structure, which is cryptologically guaranteed to be tamper-proof and unforgeable as a distributed ledger.

In related art, in order to achieve security control of resources such as audio and video files, resources are usually stored on the chain, that is, key information such as a resource per se or a hash of the resource is packaged into a block and stored locally on the blockchain node. However, although resources are stored in the blockchain, the server side usually returns a resource to a client in response to a request initiated by the client, allowing the client to freely obtain or forward the resource, causing certain security risks and infringement hazards in the resource distribution process.

SUMMARY

In view of the above, the present disclosure provides a resource distribution method and a resource distribution apparatus, in order to address the technical problem in the related art.

According to a first aspect of the embodiments of the present disclosure, there is provided a resource distribution method, applied to a first server side, including:
  in response to a resource acquisition request initiated by a first consumer terminal for a target resource, obtaining, from a blockchain network, pre-acquisition information corresponding to the resource acquisition request;
  when the obtained pre-acquisition information indicates that there is a resource pre-acquisition transaction corresponding to the first consumer terminal and the target resource stored in a blockchain ledger of the blockchain network, returning the target resource to the first consumer terminal.

According to a second aspect of the embodiments of the present disclosure, there is provided another resource distribution method, applied to a first consumer terminal, including:
  initiating to a first server side a resource acquisition request for a target resource, to trigger the first server side to obtain pre-acquisition information corresponding to the resource acquisition request from a blockchain network;
  receiving the target resource returned by the first server side, wherein the target resource is returned by the first server side when the pre-acquisition information indicates that there is a resource pre-acquisition transactions corresponding to the first consumer terminal and the target resource stored in a blockchain ledger of the blockchain network.

According to a third aspect of the embodiments of the present disclosure, there is provided yet another resource distribution method, applied to any blockchain node in a blockchain network, including:
  upon receiving a resource acquisition transaction initiated by a first server side for a target resource, determining pre-acquisition information corresponding to a resource acquisition request, wherein the resource acquisition transaction is initiated by the first server side in response to the resource acquisition request initiated by a first consumer terminal for the target resource;
  returning the pre-acquisition information to the first server side, for the first server side to return the target resource to the first consumer terminal when the obtained pre-acquisition information indicates that there is a resource pre-acquisition transaction corresponding to the first consumer terminal and the target resource stored in a blockchain ledger of the blockchain network.

According to a fourth aspect of the embodiments of the present disclosure, there is provided a resource distribution apparatus, applied to a first server side, including one or more processors configured to:
  in response to a resource acquisition request initiated by a first consumer terminal for a target resource, obtain, from a blockchain network, pre-acquisition information corresponding to the resource acquisition request;
  when the obtained pre-acquisition information indicates that there is a resource pre-acquisition transaction corresponding to the first consumer terminal and the target resource stored in a blockchain ledger of the blockchain network, return the target resource to the first consumer terminal.

According to a fifth aspect of the embodiments of the present disclosure, there is provided another resource distribution apparatus, applied to a first consumer terminal, including one or more processors configured to:
  initiate to a first server side a resource acquisition request for a target resource, to trigger the first server side to obtain pre-acquisition information corresponding to the resource acquisition request from a blockchain network;
  receive the target resource returned by the first server side, wherein the target resource is returned by the first server side when the pre-acquisition information indicates that there is a resource pre-acquisition transactions corresponding to the first consumer terminal and the target resource stored in a blockchain ledger of the blockchain network.

According to a sixth aspect of the embodiments of the present disclosure, there is provided yet another resource distribution apparatus, applied to any blockchain node in a blockchain network, including one or more processors configured to:
  upon receiving a resource acquisition transaction initiated by a first server side for a target resource, determine pre-acquisition information corresponding to a resource acquisition request, wherein the resource acquisition transaction is initiated by the first server side in response to the resource acquisition request initiated by a first consumer terminal for the target resource;

returning the pre-acquisition information to the first server side, for the first server side to return the target resource to the first consumer terminal when the obtained pre-acquisition information indicates that there is a resource pre-acquisition transaction corresponding to the first consumer terminal and the target resource stored in a blockchain ledger of the blockchain network.

According to a seventh aspect of the embodiments of the present disclosure, there is provided an electronic device characterized in that it includes: a processor; a memory for storing processor executable instructions; wherein the processor is configured to implement the method of any one of the first aspect, the second aspect, and the third aspect.

According to an eighth aspect of the embodiments of the present disclosure, there is provided a non-transitory computer-readable storage medium on which a computer program is stored, wherein when the program is executed by a processor, steps of the method described in any one of the first aspect, the second aspect, and the third aspect are implemented.

According to the embodiments of the present disclosure, the first server side responds to a resource acquisition request initiated by the first consumer terminal for the target resource and acquires pre-acquisition information corresponding to the resource acquisition request from the blockchain network. Furthermore, when the acquired pre-acquisition information indicates that there is a resource pre-acquisition transaction corresponding to the first consumer terminal and the target resource stored in the blockchain ledger of the blockchain network, the target resource is returned to the first consumer terminal.

In the above method, the first consumer terminal needs to initiate a resource acquisition request to the first server side for acquiring the target resource. Prior to this, the first consumer terminal or the first server side also needs to initiate a resource pre-acquisition transaction corresponding to the first consumer terminal and the target resource to the blockchain network, for the blockchain network to store the transaction in its own maintained blockchain ledger. It can be understood that the resource pre-acquisition transaction corresponds to the resource acquisition transaction, and both together reflect a resource acquisition event that occurs between the first consumer terminal and the first server side for the target resource. This event corresponds to the resource distribution process described in this method. Moreover, after executing the resource acquisition transaction at blockchain nodes in the blockchain network, the transactions will also be stored in the blockchain ledger. It can be seen that in the case where the first consumer terminal acquires the target resource from the first server side, both transactions related to the resource acquisition event will be stored on the chain, that is, the distribution records of the first consumer terminal for the target resource will be stored on the chain.

It can be seen that in this method, a blockchain transaction is initiated to the blockchain network, and a distribution record related to the process of the first consumer terminal acquiring the target resource from the first server side is stored to the blockchain, thereby reliable storage of the distribution record can be implemented. Based on the pre-acquisition transaction and resource acquisition transaction of the stored certificate, any distribution process of the target resource can be traced, which can improve the control ability of the target resource and reduce the security risks and infringement hazards of the resource distribution process to a certain extent.

It shall be appreciated that the above general description and the detailed description hereinafter are only illustrative and interpretative but not for limiting the present invention.

BRIEF DESCRIPTION OF THE DRAWINGS

In order to provide a clearer explanation of the technical solution in the embodiments of the present disclosures, a brief introduction will be given to the accompanying drawings referred in the description of the embodiments. Apparently, the accompanying drawings in the following description are only some embodiments of the present disclosure. For those ordinarily skilled in the art, other accompanying drawings can be obtained based on these drawings without any creative effort.

DETAILED DESCRIPTION OF THE EMBODIMENTS

The following will provide a clear and complete description of the technical solution in the embodiments of the present disclosure in conjunction with the accompanying drawings. Apparently, the described embodiments are only a part of the embodiments of the present disclosures, not all of them. Based on the embodiments in the present disclosure, all other embodiments obtained by those ordinarily skilled in the art without creative labor fall within the scope of protection in the present disclosure.

Figure 1:
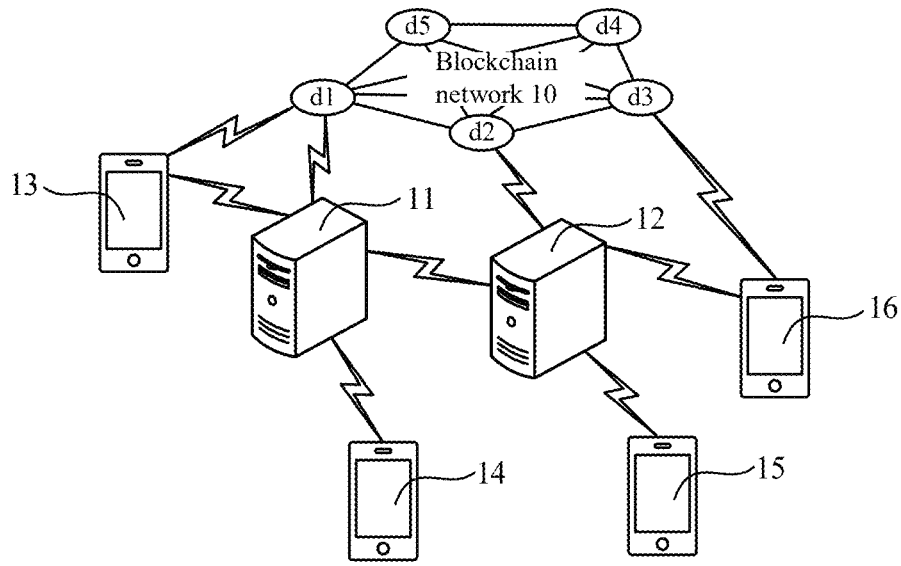
FIG. 1 is a schematic diagram of an architecture of a resource consumption system according to an embodiment of the present disclosure.

FIG. 1 is a schematic diagram of an architecture of a resource consumption system according to an embodiment of the present disclosure. As shown in FIG. 1, the system can include a blockchain network 10, a plurality of servers such as a server 11 and a server 12, and a plurality of electronic devices such as mobile phones 13, 14, 15, and 16. In fact, the resource consumption system can also include a network (not shown in the Figure), which can include various types of wired or wireless networks. The connection between the mobile phones and the servers, in between the servers, and between the mobile phones or the servers and the blockchain nodes can be implemented through corresponding networks, which will not be elaborated herein.

Here, the blockchain network 10 can be constructed based on a BaaS (Blockchain as a Service) platform, which can include a plurality of blockchain nodes, such as nodes d1 to d5, etc. Each blockchain node maintains a blockchain ledger of the blockchain network 10, which can be a distributed ledger composed of a plurality of blocks connected in chronological order. Any one block can contain one or more blockchain transactions.

Any server in the resource consumption system can be a physical server containing an independent host, or the server can be a virtual server, a cloud server hosted by a cluster of hosts, etc. Mobile phones 13-16 are only a type of terminal devices that users can use. In fact, users can also use terminal devices such as tablets, laptops, PDAs (Personal Digital A target resources), wearable devices (such as smart glasses, smartwatches, etc.), VR (Virtual Reality) devices, AR (Augmented Reality) devices, etc. This is not limited by one or more embodiments of the present disclosure.

Here, any server in the resource consumption system can be connected to the blockchain network through a blockchain node, such as servers 11 and 12 connecting to blockchain nodes d1 and d2, respectively. Any of the mobile phones can be connected to the corresponding server, such as connecting phones 13-14 to server 11, and phones 15-16 to server 12, respectively. In addition, any mobile phone can also be directly connected to a blockchain node in the blockchain network 10, and the blockchain node connected to any mobile phone can be the same or different from the blockchain node connected to the corresponding server of the mobile phone. For example, mobile phones 13 and 16 are respectively connected to nodes d1 and d3, which will not be elaborated herein.

The servers 11-12 can run the server side of the resource consumption platform, and mobile phones 13-16 can run corresponding clients. Therefore, mobile phones 13-16 can interact with the corresponding server side through their own clients run thereon. For example, mobile phones 13 and 14 can run a client of a video consumption platform and implement the video consumption function provided by the video consumption platform through interaction with server 11. Similarly, mobile phones 13-14 can run the client of a music consumption platform and implement the music consumption function provided by the music consumption platform through interaction with server 11, which will not be elaborated herein. However, servers 11 to 12 can also run server side programs from different video consumption platforms, or they can also run different functional modules from the same video consumption platform separately, which will not be elaborated herein.

In addition, the client running on the mobile phone can essentially be an application (APP), which can be installed on the phone in advance, enabling the client to be started and run on the phone. However, when using an online "client" such as HTML5 technology, it is not necessary to install the corresponding application on the phone to obtain and run the client. The embodiments of the present disclosure do not limit this.

In addition, any mobile phone or server connected to the blockchain node can locally run a software development kit (SDK) corresponding to the blockchain network. The SDK can provide an underlying logic for interacting with the blockchain, such as generating and initiating blockchain transactions to the blockchain network, listening to the execution results of blockchain transactions by the blockchain node, etc., which will not be elaborated herein.

The first server side and the second server side described in the embodiment of the present disclosure can be any server side in the resource consumption system, and the first consumer client, the second consumer client, and first production terminal can be any client in the resource consumption system, respectively. As mentioned, the first server side and the second server side can be servers 11 to 12, respectively. The first consumer client, the second consumer client, and the first production terminal can be mobile phones 13, 16, and 14, respectively. The following embodiments will be given to describe the specific situations of each participant separately, and will not be further elaborated herein. Here, the first consumer client or the second server side can serve as the first consumer terminal of the present disclosure. Similarly, the first production client or the second server side can serve as the first production terminal of the present disclosure. For example, in the case where the first server side is server 11, the first consumer terminal can be mobile phone 13 or server 12. The first production terminal can be mobile phone 14 or server 12. It can be seen that in the resource consumption system, any server side (such as server 12) can undertake the functions of both producer and consumer against other server sides (such as server 11).

Figure 2:
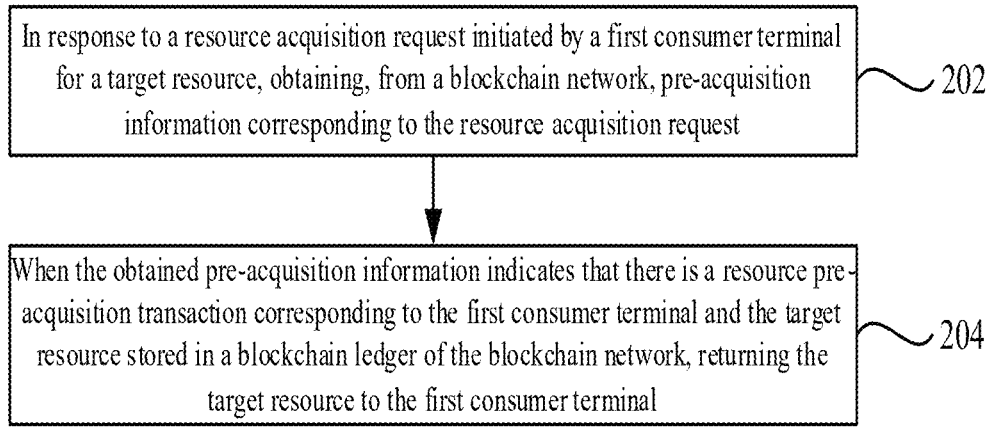
FIG. 2 is a flowchart of a resource distribution method illustrated according to an embodiment of the present disclosure.

The following provides a detailed description of the data storage method of the present disclosure in conjunction with the accompanying drawings and corresponding embodiments. FIG. 2 is a flowchart of a resource distribution method illustrated in an exemplary embodiment of the present disclosure. As shown in FIG. 2, this method is applied to a first server side, including the following steps 202-204.

In step 202, in response to a resource acquisition request initiated by a first consumer terminal for a target resource, pre-acquisition information corresponding to the resource acquisition request is obtained from a blockchain network.

In the embodiment of the present disclosure, the first server side can be used to manage to-be-consumed resources, such as storing such resources in a local storage space or managing resources stored in a distributed database. In terms of production methods, the resources can be in various forms such as UGC (User Generated Content), PGC (Professional generated Content), OGC (Occupationally generated Content), and so on. In addition, in order to further strengthen the management function for resources, the first server side can also store resource information such as file size, file hash, format information, playback time, encryption parameter, etc. of the resources into the blockchain network. The embodiments of the present disclosure do not limit this. It can be understood that the local storage space or data volume mentioned above can store the original resource files of the to-be-consumed resources, such as video files, audio files, images, etc. Usually, the original resource files occupy a large amount of storage space, while the resource information usually only needs to occupy a small amount of storage space. Therefore, through the above method, only the resource information of the to-be-consumed resources can be stored in the blockchain ledger, thereby minimizing the valuable on-chain storage space of the blockchain and improving the storage resource utilization rate of blockchain nodes.

In the embodiment of the present disclosure, the first consumer terminal can request to acquire the target resource from the first server side at a predetermined time or in response to a user operation. Taking user actions as an example, the first consumer terminal can display resource related information in the resource display interface for users to view, and then users can learn about various to-be-consumed resources from the resource related information, and implement trigger operations for the target resources they are interested in. Correspondingly, upon detecting a triggering operation, the first consumer terminal can start requesting to acquire the target resource from its corresponding first server side.

Here, the resources described in the present disclosure can be in at least one form, such as text, images, audio, video, etc. The embodiments of the present disclosure do not limit this. Taking videos as an example, the first consumer terminal can display video related information such as video homepage, video cover, video title, uploader name, upload time, playback volume, interaction volume, etc. on their own video browsing page. Users can determine the target video they are interested in (want to watch) from each candidate video by browsing the video related information, and then trigger the video related information of the target video (such as clicking on the video cover of the video). If the first consumer terminal detects the triggering operation, it indicates that it needs to request the acquisition of the target video from its corresponding first client, that is, to acquire the video data of the video. At this point, the first consumer terminal can start requesting the acquisition of the video from the first server side.

In the embodiment of the present disclosure, in order to fully store the relevant information of the distribution process of the target resource on the chain, a blockchain transaction corresponding to the first consumer terminal and the target resource can be initiated to the blockchain network. Specifically, a resource pre-acquisition transaction can be initiated first, and a corresponding resource acquisition transaction can be initiated later.

In one implementation, the resource pre-acquisition transaction can be initiated to the blockchain network in various ways. As an example, the first consumer terminal can generate and initiate a resource pre-acquisition transaction to the blockchain network. Here, the resource pre-acquisition transaction includes relevant information about a resource acquisition event, such as a client ID of the first consumer terminal, a device ID of the terminal device where the client is on, a user ID of the corresponding user of the client (such as a user account), a resource ID of the to-be-acquired target resource, and a valid time information of the resource pre-acquisition transaction. Such information can be used to indicate which first consumer requests to acquire which target resource. Specifically, the first consumer terminal can call a locally running chain machine SDK, generate the resource pre-acquisition transaction based on the relevant information in the transaction format supported by the blockchain network, and send the transaction to the blockchain node the first consumer terminal is connected to, thereby initiating the transaction to the blockchain network. For example, after determining that the mobile phone 13 shown in FIG. 1 needs to acquire the target resource, the mobile phone 13 can initiate a resource pre-acquisition transaction to blockchain node d1 based on the relevant information corresponding to the resource. Alternatively, after receiving a resource acquisition request initiated by mobile phone 16 for the target resource, server 12 can respond to the request to determine the relevant information of the target resource, and then initiate a resource pre-acquisition transaction to blockchain node d3.

As another example, in order to reduce a number of devices accessing the blockchain network and reduce the maintenance workload of blockchain nodes on their connected devices, clients can also access the blockchain network uniformly through the server side, that is, client corresponding to any server side can interact with the blockchain nodes in the blockchain network through the server side as an intermediary (or proxy). In this case, the first consumer terminal can initiate a resource pre-acquisition transaction to the blockchain network through the first server side. For example, the first consumer terminal can initiate a resource pre-acquisition request to the first server side for the target resource, which can include the relevant information mentioned above. Correspondingly, the first server side can generate a resource pre-acquisition transaction based on the relevant information and initiate the transaction to the blockchain network. As shown in FIG. 1, mobile phone 13 can initiate a resource pre-acquisition request to server 11, and in response to this request, server 11 initiates a resource pre-acquisition transaction for the target resource to blockchain node d1. Alternatively, server 12 can forward the resource acquisition request initiated by mobile phone 16 for the target resource to server 11, such that server 11 can respond to the request and initiate a resource pre-acquisition transaction for the target resource to blockchain node d1. In this example, the resource pre-acquisition transaction can be generated by server 11 calling a locally running chain machine SDK. In this scenario, the first server side can initiate resource pre-acquisition transaction for a corresponding resource to the blockchain network on behalf of its corresponding consumer client or other server side.

After receiving the resource pre-acquisition transaction initiated by the first server side or the first consumer terminal, the blockchain node can synchronize the transaction with other blockchain nodes in the blockchain network, and each blockchain node in the network can participate in a consensus process for the transaction. The specific consensus process of the resource pre-acquisition transaction can be found in known methods of blockchain networks of the relevant art, which will not be repeated herein. It should be noted that due to the different functions of the blockchain nodes in the blockchain network, the consensus process can also be completed by only the consensus nodes with consensus functions, while other nodes cannot participate in the consensus process. Here, the resource pre-acquisition transaction will be packaged into blocks along with other transactions in the blockchain network. When the consensus is passed, each blockchain node in the blockchain network will determine the block where the transaction is located, and store the block onto the chain by recording block information of the previous block in the block header, that is, by connecting the block on which the consensus is passed to the end of the blockchain ledger. Afterwards, the resource pre-acquisition transaction is stored separately by the blockchain nodes in the blockchain ledger of the blockchain network maintained by the blockchain nodes, i.e. the transaction is completed and uploaded.

However, the blockchain network may also experience abnormal situations such as the resource pre-acquisition transaction not being able to pass consensus or insufficient storage space in blockchain nodes, resulting in the resource pre-acquisition transaction not being successfully stored in the blockchain ledger of the blockchain network. It can be seen that the first resource pre-acquisition transaction corresponding to the first consumer terminal and the target resource may or may not be successfully stored in the blockchain ledger.

In the case where the resource pre-acquisition transaction is initiated by the first consumer terminal, the blockchain node can return a corresponding storage success message to the first consumer terminal after successfully storing the resource pre-acquisition transaction in the blockchain ledger. This message is used to inform the first consumer terminal that the resource pre-acquisition transaction has been successfully stored in the blockchain ledger of the blockchain network. However, it is also possible to return the corresponding storage failure message in the event of a storage failure, which will not be elaborated herein. Alternatively, in order to quickly perceive the storage results of resource pre-acquisition transactions, the first consumer terminal can also listen to the execution results of the resource pre-acquisition transaction through the monitoring mechanism provided by the blockchain network to determine whether the transaction has been successfully stored in the blockchain ledger.

In the case where the resource pre-acquisition transaction is initiated by the first server side in response to a resource pre-acquisition request initiated (or forwarded) by the first consumer terminal, the first server side can forward the storage success message or storage failure message returned by the blockchain node to the first consumer terminal. Alternatively, the first server side can listen to the execution result of the resource pre-acquisition transaction through a listening mechanism, and send a corresponding storage success message to the first consumer terminal when the listening result indicates that the transaction has been successfully stored in the blockchain ledger. However, it is also possible to send a corresponding storage failure message to the first consumer terminal when the listening result indicates that the transaction has not been successfully stored in the blockchain ledger. Through the above method, the first consumer terminal can know whether the resource pre-acquisition transaction has been successfully stored in the blockchain ledger of the blockchain network.

In the case where the resource pre-acquisition transaction has not been successfully stored in the blockchain ledger, the first consumer terminal can avoid initiating the resource acquisition request to the first server side. In the case where the resource pre-acquisition transaction is successfully stored in the blockchain ledger, the first consumer terminal can initiate a resource acquisition request for the target resource to the first server side for acquiring the target resource from the first server side.

To prevent the resources managed by the first server side from being arbitrarily obtained by clients, the first server side can manage legitimate clients with resource access permissions through an authentication mechanism. For example, the first server side can maintain a consumer list, which can be used to record the consumer identification of each consumer that has passed the authentication of the first server side. As mentioned earlier, the first consumer terminal of the present disclosure can include a first consumer client corresponding to the first server side and a second server side that is different from the first server side. Therefore, to effectively distinguish different types of server sides, the different types of server sides mentioned above can have different consumer identifiers. As shown in FIG. 1, if the clients running on mobile phones 13 and 14 (hereinafter referred to as client 13 and client 14) have both passed the authentication of server 11, the client IDs of client 13 and client 14 should be recorded in the consumer list maintained by server 11. If server 12 has passed the authentication of server 11, the consumer list maintained in server 11 should record the server ID of server 12, which will not be repeated. Here, the consumer identification described in this method can be the signature or token of the consumer side, and the embodiments of the present disclosure do not limit this.

It can be understood that if the consumer identity of the terminal where a certain client is located is recorded in the consumer list, it indicates that the client has been authenticated to the first server side, which means that the client can be regarded as the legitimate consumer terminal corresponding to the first server side. On the contrary, if the consumer identity of the terminal where a certain client is located is not recorded in the consumer list, it indicates that the client has not been authenticated to the first server side, which means that the client can be regarded as an illegitimate consumer terminal corresponding to the first server side. Therefore, the first server side can control the process of obtaining consumer resources from the first consumer terminal based on the consumer list. For example, when the first server side receives a resource acquisition request initiated by the first consumer terminal, it can first determine the first identifier of the first consumer terminal carried in the request, and then search for the identifier in the consumer list. If the first identifier is found (i.e. the first identifier is recorded in the consumer list), it indicates that the initiator of the resource acquisition request (i.e. the first consumer terminal) is the legitimate consumer terminal corresponding to the first server side, and can respond to the request normally at this time. On the contrary, if the first identifier is not found (i.e. the first identifier is not recorded in the consumer list), it indicates that the initiator of the resource acquisition request (i.e. the first consumer terminal) is the illegitimate consumer terminal corresponding to the first server side. At this time, the response request can be rejected, such as discarding the request, further recording the request, or issuing an alarm against the request, which will not be elaborated herein. In addition, if the first identifier is found, the first server side can also determine the type of the first consumer terminal. For example, if the first identifier is the client identifier, it indicates that the first consumer terminal is the first consumer client corresponding to the first server side. In the case where the first identifier is the server identifier, it indicates that the first consumer terminal is the second client corresponding to the first server side.

In the process of authenticating the first consumer terminal on the first server side, in order to avoid disclosing the device privacy information (such as the encryption algorithm, TEE (Trusted Execution Environment) parameter, device private key, etc.) of the device where the first consumer terminal is located (hereinafter referred to as the first consumer device) to the first server side, the first terminal can be authenticated based on the Zero Knowledge Proof (ZKP) algorithm. For example, the first consumer terminal can first determine the device privacy information and device public information of the first consumer device, where the device public information is the Public information in the ZKP algorithm, such as the device type and device number (such as IMEI (International Mobile Equipment Identity), MSN (Mechanical Serial Number), etc.) of the first consumer device, the MAC (Media Access Control Address) address, device public key, etc., which are not limited by the embodiments of the present disclosure. Then, the first consumer terminal can calculate the corresponding proof and an authentication parameter based on the pre-defined (such as those recorded in the installation file of the first consumer terminal) ZKP algorithm polynomial, based on the device privacy information and device public information mentioned above.

Furthermore, the first consumer client can initiate a pre-authentication request with its own first identifier and the authentication parameter to the first server side, and the first server side can respond to the request by initiating a pre-authentication transaction with the first identifier and the authentication parameter to the blockchain network. Similar to the resource pre-acquisition transaction, a blockchain node in a blockchain network can store the pre-authentication transaction in the blockchain notebook of the network after the pre-authentication transaction passes consensus, and notify the first server side of the corresponding storage result with a return message or through a listening mechanism. Thus, the first server side can return the transaction related information of the pre-authentication transaction to the first consumer terminal after confirming that the pre-authentication transaction has been successfully stored in the blockchain ledger. Here, the block to which the pre-authentication transaction belongs is the block where the pre-authentication transaction is located after the pre-authentication transaction is stored onto the chain. The transaction related information can include transaction information of the pre-authentication transaction (such as transaction hash, transaction initiator, transaction initiation time, contract address of the smart contract called by the transaction, transaction receipt, etc.) and block information (such as block hash, block height, etc.) of the block to which the transaction belongs, which will not be elaborated herein. In addition, the first server side can cache the first identifier and the authentication parameter contained in the pre-authentication request locally for use in subsequent authentication processes.

Upon acquiring the transaction related information, the first consumer terminal can calculate the authentication proof of the ZKP algorithm based on the proof parameter, device privacy information of the first consumer device, and the transaction related information. Furthermore, the first consumer terminal can initiate an authentication request to the first server side, and the request can include the authentication proof and device public information. Thus, the first server side can respond to the request to determine the transaction related information related to the authentication transaction. If the information is cached in the previous steps, the information can be directly searched out from the cache; while if the information is cached in the previous steps, it can be requested from the blockchain network to obtain it. Afterwards, the first server side can verify the authentication proof carried in the authentication request based on a verification parameter, device public information of the device where the first consumer terminal is located, and the transaction related information. In the above steps, the specific method of the first consumer terminal calculating the authentication proof and verifying the to-be-verified authentication proof by the first server side is determined by the specific implementation of the ZKP algorithm used, and the embodiments of the present disclosure do not limit this. It can be understood that if the above to-be-verified authentication proof passes the verification, it indicates that the first consumer terminal has passed the authentication of the first server side. At this time, the first server side can record the first identifier of the first server side in its own maintained consumer list, thereby completing the authentication process of the first consumer terminal. After the recording is completed or in the case of authentication failure, corresponding notification messages can be returned to the first consumer terminal in order to notify the first consumer terminal in a timely manner.

It can be understood that the authentication process of zero knowledge proof achieves the binding of the first consumer terminal and the first consumer device, as the authentication proof generation process uses the device privacy information of the first consumer device. Through the above method, the first consumer terminal is granted access permissions to the to-be-consumed resources managed by the first server. Accordingly, based on the above authentication method, it can ensure that authenticated consumer terminals running on legitimate devices can smoothly acquire target resources from the first server side, while illegitimate consumer terminals running on other devices cannot acquire target resources from the first server side (i.e. illegitimate consumer terminals without passing zero knowledge authentication cannot acquire the target resources from the first server side), thus ensuring permission control over the distribution process of target resources, which can reduce security risks and infringement risks in the resource distribution process. It should also be noted that both the consumer party of the target resource (such as the first consumer terminal) and its producer party (i.e. the first production terminal uploading the resource) can be the client or server side that passes authentication in the first server side.

In step 204, when the obtained pre-acquisition information indicates that there is a resource pre-acquisition transaction corresponding to the first consumer terminal and the target resource stored in a blockchain ledger of the blockchain network, the target resource is returned to the first consumer terminal.

Upon receiving the resource acquisition request initiated by the first consumer terminal for the target resource, the first server side can respond to the request by obtaining pre-acquisition information corresponding to the resource acquisition request from the blockchain network. Furthermore, the first consumer terminal can determine whether the resource pre-acquisition transaction has been successfully stored in the blockchain ledger of the blockchain network based on the pre-acquisition information.

In one embodiment, in order to improve the response efficiency of the interaction between the first consumer terminal and the first server side to the resource acquisition request, the first consumer terminal can simultaneously initiate multiple requests or transactions to the first server side. For example, in the case where the resource pre-acquisition transaction is initiated by the first server side in response to the resource pre-acquisition request, the first consumer terminal can initiate a resource acquisition request simultaneously with the resource pre-acquisition request. For example, in the case where the resource pre-acquisition transaction is initiated by the first consumer terminal, the first consumer terminal can initiate a resource acquisition request simultaneously with initiating the resource pre-acquisition transaction. Furthermore, the first server side can immediately respond to the resource acquisition request without notifying the first consumer terminal when the first server side learns through the storage success message or monitoring mechanism that the resource pre-acquisition transaction has been successfully stored in the blockchain ledger, thereby saving the time required to notify the first consumer terminal that the resource pre-acquisition transaction has been successfully stored. To some extent, it has improved the response efficiency of the first server to resource acquisition requests.

In the process of responding to the resource acquisition request, the first server side can initiate an information acquisition request or an information acquisition transaction to the blockchain node connected to the first server side, in order to acquire the pre-acquisition information corresponding to the resource acquisition request from the blockchain node. The information acquisition request and the information acquisition transaction can include information such as the first identifier of the first consumer terminal or the transaction hash of the resource pre-acquisition transaction, such that the blockchain node can determine the stored resource pre-acquisition transaction in the locally maintained blockchain ledger based on the above information, and then determine the corresponding pre-acquisition information. The pre-acquisition information can include a storage result flag, which is used to represent whether the resource pre-acquisition transaction has been successfully stored in the blockchain ledger. For example, if the value of the flag is 1, it can indicate that the resource pre-acquisition transaction has been successfully stored in the blockchain ledger, and if the value of the flag is 0), it can indicate that the resource pre-acquisition transaction was not successfully stored in the blockchain ledger. In addition, in the case where the resource pre-acquisition transaction is successfully stored in the blockchain ledger, the pre-acquisition information may also include information such as the transaction hash of the resource pre-acquisition transaction, the block hash or block height of the block to which the transaction belongs.

In the case where the resource pre-acquisition request and the resource acquisition request are initiated simultaneously by the first consumer terminal, and the resource pre-acquisition transaction is initiated by the first server side in response to the resource pre-acquisition request initiated by the first consumer terminal, the blockchain nodes in the blockchain network can respond to the information acquisition request or the information acquisition transaction, determine the corresponding pre-acquisition information based on the resource pre-acquisition transaction for the target resource and the storage state of the transaction, and return the pre-acquisition information to the first server side after confirming that the resource pre-acquisition transaction has been successfully stored in the blockchain ledger. By using this method, the determination of the storage state of the resource pre-acquisition transaction is advanced (i.e. determined by blockchain nodes), such that the first server side can directly determine that the resource pre-acquisition transaction has been successfully stored in the blockchain ledger after acquiring the pre-acquisition information, thereby simplifying the determination logic of the first server side for pre-acquisition information, which can improve the response speed of the first server side to resource acquisition requests, and even if the first server side receives a large number of resource acquisition requests in a short period of time, the first server side can try to complete the response process as smoothly as possible.

In the process of responding to the resource acquisition request, the first server side can determine whether the resource pre-acquisition transaction has been successfully stored in the blockchain ledger based on the acquired pre-acquisition information. As mentioned earlier, the resource pre-acquisition transaction may or may not be successfully stored in the blockchain ledger. Correspondingly, blockchain nodes can return the pre-acquisition information to the first server side upon finding the resource pre-acquisition transaction, such that the first server side can directly determine that the resource pre-acquisition transaction has been successfully stored in the blockchain ledger upon receiving the message. Alternatively, blockchain nodes can also not return corresponding pre-acquisition information, return pre-acquisition information with empty content, or return pre-acquisition information with a storage result flag value of 0) when not finding the pre-acquisition transaction of the resource, such that the first server side can determine based on the above information that the blockchain ledger of the blockchain network does not store a resource pre-acquisition transaction corresponding to the first consumer terminal and the target resource. Through the above method, the first server side can determine whether the condition of "a resource pre-acquisition transaction corresponding to the first consumer terminal and the target resource is stored in the blockchain ledger of the blockchain network" is satisfied based on the pre-acquisition information.

When the condition of "a pre-acquisition transaction corresponding to the first consumer terminal and the target resource is stored in the blockchain ledger maintained by the blockchain network" is satisfied, the first server side returns the target resource to the first consumer terminal.

In an implementation, the first server side can return the target resource to the first consumer terminal when the current time is within a validity period of the resource pre-acquisition transaction. It can be understood that at this point, the first server side not only determines whether the condition is satisfied, but also determines whether the condition "the current time is within the validity period of the resource pre-acquisition transaction" is satisfied, and returns the target resource to the first consumer terminal when both conditions are satisfied.

In an implementation, the resource pre-acquisition transaction may include valid time information, which is used to indicate the validity period of the resource pre-acquisition transaction. Here, if any resource acquisition request and resource pre-acquisition transaction are both initiated by the same client for the same resource, or if any resource acquisition request is initiated by a client for a certain resource and the resource pre-acquisition transaction is initiated by a server side corresponding to the client in response to the resource pre-acquisition request initiated by the client, the resource acquisition request and the blockchain network correspond to each other-both indicate that the same requester requests to acquire the same resource. If the first server side receives a resource acquisition request corresponding to the resource pre-acquisition transaction within its validity period, it can respond to the request normally. On the contrary, if the first server receives a resource acquisition request corresponding to the resource pre-acquisition transaction after it exceeds the validity period, there is no need to respond to the request. At this time, the request can be discarded, recorded, or an alarm can be triggered for the request, which will not be elaborated herein.

Here, the valid time information can be the deadline, as in the case where the valid time information is time in a form of "xx. yy. xx", it can be used to indicate that the resource pre-acquisition transaction is valid before that time, but invalid after that time. Alternatively, given the potential fluctuation in the outbound time of the blockchain network (i.e. the time interval between adjacent blocks in the blockchain ledger being connected to the ledger), the validity period of the resource pre-acquisition transaction can also be characterized using a block height. For example, the resource pre-acquisition transaction can include a number of valid blocks. Based on this, the first server side can first determine a starting block height of the block to which the resource pre-acquisition transaction belongs and the maximum block height at the current time. Furthermore, if the maximum block height is not greater than the sum of the starting block height and the number of valid blocks, it can be determined that the current time is within the validity period of the resource pre-acquisition transaction. On the contrary, if the maximum block height is greater than the sum of the starting block height and the number of valid blocks, it can be determined that the current time is not within the validity period of the resource pre-acquisition transaction, that is, the current time has exceeded the validity period of the resource pre-acquisition transaction indicated by the number of valid blocks.

Here, the first server side can determine the block height (i.e. the starting block height) block which the resource pre-acquisition transaction belongs to through various methods. For example, in the above steps, the blockchain network can directly return the block height (i.e. the starting block height) of the resource pre-acquisition transaction to the first consumer terminal or return it to the first consumer terminal through the first server side, upon determining that the resource pre-acquisition transaction has been successfully stored in the blockchain ledger. Based on this, the first consumer terminal can initiate a resource acquisition request to the first server side carrying the starting block height. Correspondingly, the first server side can determine the starting block height carried in the request upon receiving the resource acquisition request. For example, the resource acquisition request initiated by the first consumer terminal can also carry a block summary of the resource pre-acquisition transaction block (i.e. the initial block summary below). Correspondingly, the first server side can send the initial block summary to the blockchain network for the blockchain node to search for the resource pre-acquisition transaction block and its initial block height in the locally maintained blockchain ledger based on the summary. Upon determining that the resource pre-acquisition transaction has been successfully stored in the blockchain ledger, the initial block height is returned to the first server side. Thus, the first server side can receive the initial block height returned by the blockchain network (actually the blockchain node connected to the first server side).

Through the above method, the first server side can acquire the starting block height of the transaction block from the first consumer terminal or the blockchain network for the pre-acquisition resources. Furthermore, the sum of the starting block height and the number of valid blocks recorded in the resource pre-acquisition transaction can be used as the final block height corresponding to the validity period of the resource pre-acquisition transaction. If the maximum block height of the blockchain ledger at the current time is not greater than the final block height, it can be determined that the current time is still within the validity period of the resource pre-acquisition transaction. It can be understood that due to the distributed structure of the blockchain nodes in the blockchain network, it may be difficult for each blockchain node to have a unified and accurate clock. However, this approach can achieve consistent validity period of the resource pre-acquisition transaction among different blockchain nodes based on the consistency of the blockchain ledger among the different blockchain nodes. This can ensure consistency between the execution results obtained from the resource pre-acquisition transaction and resource acquisition transaction performed by each blockchain node.

In an implementation, when uploading resources to the first server side in the direction of resource production, the first server side can store the corresponding resource information in the blockchain network for verification of resource acquisition transactions during resource distribution. Taking the target resource as an example, when the first server side receives the target resource uploaded by the first production terminal (i.e. the production party of the target resource), on the one hand, the first server side can store the target resource, and on the other hand, the first server side can initiate a resource storage transaction containing resource information of the target resource to the blockchain network, such that the blockchain network can store the resource storage transaction in the blockchain ledger.

Based on this, for the resource acquisition request initiated by the first consumer terminal, the first server side can include the to-be-verified resource information carried in the resource acquisition request in the resource acquisition transaction and send it to the blockchain network, and return the target resource to the first consumer terminal upon receiving a verification succeeded message returned by the blockchain network. The verification succeeded message is returned by the blockchain network upon determining that the to-be-verified resource information matches the resource information contained in the resource storage transaction. Here, the resource information of the target resource can include a file size, a file hash, format information, playback time, encryption parameter, etc. of the resource. Correspondingly, the to-be-verified resource information can include the resource information of the to-be-acquired target resource. Based on this, the blockchain network can search for a resource storage transaction that matches the information of the to-be-verified resource in the locally stored resource storage transaction, determine the resource corresponding to the queried resource storage transaction as the target resource, and then return a verification succeeded message for the target resource to the first server side. However, in the case where the resource storage transaction is not found, a verification failure message can be returned to the first server side to indicate that the first server side not to return the target resource to the first consumer terminal, thereby achieving distribution control of the registered resources through this method.

The following will explain the process of returning a target resource from the first server side to the first consumer terminal with reference to some implementations.

In one implementation, the resource acquisition request initiated by the first consumer side may carry an encrypted parameter. Based on this, the first server side can use the encryption parameter to encrypt the target resource, and then return the corresponding ciphertext data to the first consumer terminal. It can be understood that because the encryption parameter is provided by the first consumer terminal, the first consumer terminal can maintain a decryption parameter corresponding to the encryption parameter and, upon receiving the ciphertext data, use the decryption parameter to decrypt it to obtain the target resource in plaintext form, thereby ensuring the private transmission of the target resource and preventing the plaintext of the target resource from being leaked to illegitimate consumer terminals, improve security during the transfer of target resources. Specifically, in the case where the encryption parameter is a symmetric key, the first consumer terminal can maintain the symmetric key locally. In the case where the encryption parameter is a public key in an asymmetric key, the first consumer terminal can maintain the corresponding private key locally. Here, the encryption and decryption parameters can be generated by the first consumer terminal, for example, the first consumer terminal can derive the encryption and decryption parameters based on its own original key. In addition, the encryption/decryption parameters can have data uniqueness. For example, for a to-be-acquired target resource, the first consumer terminal can generate encryption/decryption parameters for that data, and after acquiring the target resource in clear text through the above process, destroy the encryption/decryption parameters for that target resource. Afterwards, when acquiring the next target resource, the first consumer terminal can generate encryption/decryption parameters for the next target resource again, ensuring that different encryption/decryption parameters are used for transmission and decryption of different target resources. It can be understood that the above process achieves one-time use of encryption/decryption parameters. Even if the encryption/decryption parameters of a certain target resource are leaked, it can still ensure the private transmission of other target resources, effectively controlling the scope of the leakage event and further improving the overall privacy of the target resource transmission process.

In the case where the target resource is a video, the first server side can use different encryption methods to encrypt the target resource based on different encryption parameters. For example, in the case where the encryption parameter includes a first key, the first server side can use the first key to encrypt all video frame images of the video. However, in order to reduce the workload of encryption processing and the overall time consumption of the encryption process, it is also possible to encrypt only a portion of the video frame images. At this point, the first server side can select a portion of the (to-be-encrypted) video frame images from all the video frame images by random selection or equidistant selection.

In general, the entire video frame images of the video will contain certain keyframes. In the case where the video is encoded according to the H264 protocol, all video frame images include three types: I frame (fully encoded), P frame (referring to the frame generated by the previous I frame that only contains differential encoding), and B frame (referring to the frame generated by the frame before and after that only contains differential encoding). Here, I frame is a necessary frame for decoding the video, so it is a key frame. Based on this, in the case where the encryption parameter includes an encryption modulus (enmod) and a second key, the first server side can determine key frames in the video frames based on the encryption modulus and the frame sequence number (seq) of the video frames in the video, and use the first key to encrypt the key frames. At this point, the first server side can achieve good encryption results with less encryption workload by only encrypting the key frames in the video.

In another implementation, the resource acquisition request may also carry format information indicating a specific data format. Based on this, the first server side can process the original resource file of the target resource into data to be transmitted in accordance with the specific data format, and transfer the data to be transmitted to the first consumer terminal. As an example, the specific data format can be RTSP (Real Time Streaming Protocol), UDP (User Datagram Protocol), HTTP (Hyper Text Transfer Protocol), HLS (HTTP Live Streaming, HTTP based adaptive bitrate streaming protocol), etc., which the embodiments of the present disclosure do not limit. In addition, from the perspective of the data format of the transmitted data, the data stream of the target resource can be transmitted according to the data format of the streaming media. At this time, the first consumer client can directly play the received video. The complete resource file can also be transmitted in the form of a resource file, at which point the first consumer terminal can receive the completed video file. Through the above method, both parties involved in the transmission of the target resource can transmit data in a unified data format, avoiding the occurrence of abnormal situations where the first consumer terminal cannot decode the target resource, thereby ensuring the smooth completion of the data transmission and decoding process of the target resource.

Usually, the user of the first consumer terminal may have needs for processing a target resource, such as forwarding the target resource to other consumer terminals, or performing post-processing such as editing, typesetting, and editing on the target resource. However, the owner of the target resource (such as the resource producer) and a regulatory authority (such as a management of a resource consumption platform) may want to limit the implementation of the processing, such as an UP owner not wanting his video to be edited by other users at will, or a video platform that is subject to copyright requirements does not allow users to freely forward certain videos. In this regard, before returning the target resource to the first consumer terminal, the first server side can set at least one permission identifier for the target resource, and the value of the permission identifier is used to indicate that the first consumer terminal is allowed to implement a preset operation on the target resource. Specifically, the first server side can respond to the setting operation of the target video by all parties or regulatory policies mentioned above, and set the above permission identification for the target video. Alternatively, the first server side can also automatically query the preset permission setting rules and make the above settings according to these rules after obtaining full authorization from various parties involved in the target resource, thereby simplifying the setting operations for the relevant parties.

After the completion of the permission identification settings, the implementation of permission management requires the cooperation of the first consumer terminal. For example, before responding to a user request to implement any preset operation on the target resource, the first consumer terminal can first check whether the operation matches the value of the permission identifier of the target resource, and perform the preset operation if it matches. For example, in the case where the first consumer client detects a user's editing operation on the target resource, the current value of the editing permission identifier of the target resource can be checked, and further editing can be performed when this value indicates that the target resource can be edited. In the case where this value indicates that the target resource cannot be edited, the editing is rejected and the user is advised of this. Alternatively, when the second server side receives a forwarding request for the target resource initiated by the second consumer client, it can check the current value of the forwarding permission identifier of the target resource and proceed with forwarding if the value indicates that the target resource can be forwarded. If the value indicates that the target resource cannot be edited, the forwarding is rejected and a corresponding advisory message is returned to the second consumer client.

In another implementation, in order to accelerate resource distribution speed and improve distribution efficiency, the first server side can send the target resource to the first consumer terminal through a distributed CDN (Content Delivery Network). Here, the CDN network is composed of multiple CDN nodes, each node can store all or part of the data of the target resource separately. Based on this, the first server side can determine the CDN node closest to the client based on the network address of the first consumer terminal, and the node will transmit the data of the target resource to the first consumer terminal, thereby achieving the distribution of the target resource. In addition, the process of distributing the target resources based on CDN can be implemented using QoS (Quality of Service) algorithms. The specific implementation process can be documented in related art and will not be repeated here. Accordingly, because the target resource is actually transmitted by the CDN node nearby, it can not only improve the transmission efficiency of the target resource, but also simplify the data distribution logic of the first server side, thereby improve the request processing efficiency of the first server side.

Specifically, when the first server side returns the target resource to the first consumer terminal, it can directly send the original resource file of the target resource to the first consumer terminal. Alternatively, in order to reduce the data transmission volume of the first server side and thus reduce its workload in the resource distribution process, the first server side can also send the storage address of the original resource file of the target resource to the first client, such that the first client can download the original resource file based on the storage address. For example, the storage address mentioned above can be the storage address of the target resource in another storage space different from the local storage space of the first server side, such as the storage address of the target resource in the distributed database corresponding to the CDN. The embodiments of the present disclosure do not limit this.

As mentioned earlier, the first consumer terminal of the present disclosure can be a second server side that is different from the first server side. In this case, the resource pre-acquisition transaction or resource pre-acquisition request is initiated by the second server side in response to a resource consumption request initiated by the second consumer client for the target resource. It can be understood that cross server forwarding between the first and second server sides, such as cross platform or cross application forwarding, can be achieved for the target resource at this time. Taking the second server side initiating the resource acquisition request to the first server side in response to the resource consumption request initiated by the second consumer client for the target resource as an example, the forwarding process will be described as follows.

The first server side can respond to a resource acquisition request initiated by the second server side for the target resource, and acquire pre-acquisition information corresponding to the resource acquisition request from the blockchain. When the acquired pre-acquisition information indicates that there is a resource pre-acquisition transaction corresponding to the second server side and the target resource stored in the blockchain ledger of the blockchain network, the storage address of the target resource is returned to the second server side. This method initiates a blockchain transaction to the blockchain network and stores the obtained records related to the process of the second server side requesting the forwarding of the target resource from the first server side onto the blockchain, achieving reliable storage of a resource forwarding record. Based on the stored pre-acquisition transaction and resource acquisition transaction, any forwarding process of the target resource can be traced, which can improve management on the target resources and reduce the security risks and infringement hazards of the resource forwarding process to a certain extent.

Here, similar to the resource pre-acquisition transaction, the resource pre-acquisition transaction can be initiated by the second server side to the blockchain network. Alternatively, the first server side can initiate a resource pre-acquisition request to the blockchain network in response to the target resource initiated by the second server side.

It can also be understood that after receiving the storage address of the target resource, the second server side can obtain the target resource from its corresponding second consumer client based on the address. For example, the second consumer client can initiate a resource consumption request to the second server side, and the resource pre-acquisition transaction or the resource pre-acquisition request can be initiated by the second server side to the first server side in response to the resource consumption request. Based on this, the storage address obtained by the second server side can be used by the second server side to forward the target resource to the second consumer client. The second server side can respond to the resource consumption request by returning the storage address to the second consumption client, or it can also read the original resource file of the target resource from the storage address and return the file to the second consumption client for consumption.

As shown in FIG. 1, the server 12 can respond to a resource consumption request initiated by the mobile phone 16 and directly initiate a resource pre-acquisition transaction for a target resource to the blockchain node d2. Alternatively, a resource pre-acquisition request for the target resource can be initiated to the server 11, and the server 11 can initiate a resource pre-acquisition transaction for the target resource to the blockchain node d1. Each blockchain node in the blockchain network can package and store the transaction in its own maintained blockchain ledger of the blockchain network after passing the consensus on the resource pre-acquisition transaction. Furthermore, the server 12 can initiate a resource acquisition request for the target resource to the server 11, such that the server 11 can obtain pre-acquisition information from the blockchain node d1 in response to the request, and determine whether the condition of "a resource pre-acquisition transaction corresponding to the second server side and the target resource being stored in the blockchain ledger of the blockchain network" is satisfied based on this information. Then, if the condition is satisfied, the storage address of the target resource is returned to the server 12. However, in the event that this condition is not satisfied, the response process for the request can be directly terminated and an acquisition failure message can be returned to the server 12. Furthermore, the server 12 can send the storage address to the mobile phone 16 for the mobile phone 16 to acquire the target resource from the storage address. Alternatively, the server 12 can also read the target resource from the storage address and send the target resource to the mobile phone 16. After acquiring the target resource, the mobile phone 16 can consume (such as displaying, playing, etc.) the target resource, which will not be elaborated herein.

According to the embodiments of the present disclosure, the first server side responds to a resource acquisition request initiated by the first consumer terminal for the target resource and acquires pre-acquisition information corresponding to the resource acquisition request from the blockchain network. Furthermore, when the acquired pre-acquisition information indicates that there is a resource pre-acquisition transaction corresponding to the first consumer terminal and the target resource stored in the blockchain ledger of the blockchain network, the target resource is returned to the first consumer terminal.

In the above method, the first consumer terminal needs to initiate a resource acquisition request to the first server side for acquiring the target resource. Prior to this, the first consumer terminal or the first server side also needs to initiate a resource pre-acquisition transaction corresponding to the first consumer terminal and the target resource to the blockchain network, for the blockchain network to store the transaction in its own maintained blockchain ledger. It can be understood that the resource pre-acquisition transaction corresponds to the resource acquisition transaction, and both together reflect a resource acquisition event that occurs between the first consumer terminal and the first server side for the target resource. This event corresponds to the resource distribution process described in this method. Moreover, after executing the resource acquisition transaction at blockchain nodes in the blockchain network, the transactions will also be stored in the blockchain ledger. It can be seen that in the case where the first consumer terminal acquires the target resource from the first server side, both transactions related to the resource acquisition event will be stored on the chain, that is, the distribution records of the first consumer terminal for the target resource will be stored on the chain.

It can be seen that in this method, a blockchain transaction is initiated to the blockchain network, and a distribution record related to the process of the first consumer terminal acquiring the target resource from the first server side is stored to the blockchain, thereby reliable storage of the distribution record can be implemented. Based on the pre-acquisition transaction and resource acquisition transaction of the stored certificate, any distribution process of the target resource can be traced, which can improve the control ability of the target resource and reduce the security risks and infringement hazards of the resource distribution process to a certain extent.

Figure 3:
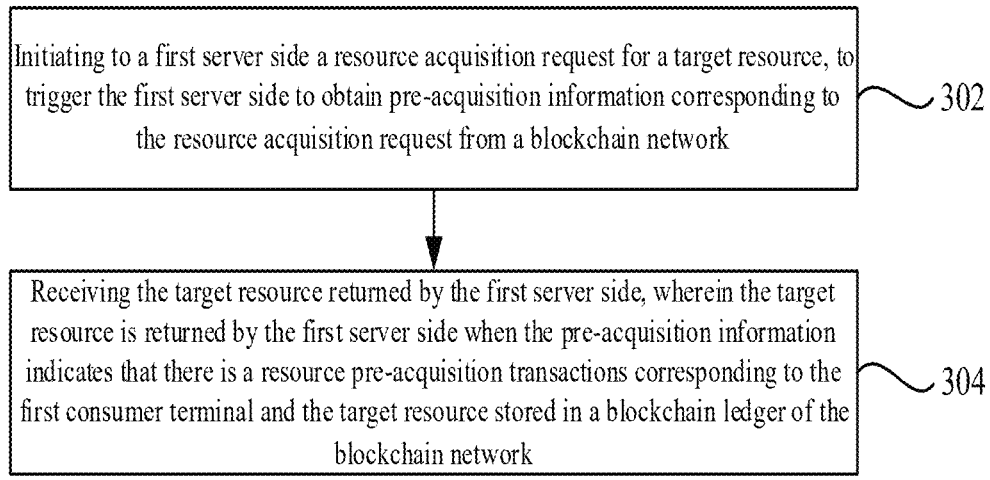
FIG. 3 is a flowchart of another resource distribution method illustrated according to an embodiment of the present disclosure.

Corresponding to the above embodiment, the present disclosure also provides a resource distribution method applicable to the first consumer terminal and any blockchain node in the blockchain network, respectively. FIG. 3 is a flowchart of another resource distribution method illustrated in an exemplary embodiment of the present disclosure. As shown in FIG. 3, the method is applied to the first consumer terminal and may include the following steps 302-304.

In step 302, a resource acquisition request for a target resource is initiated to the first server side to trigger the first server side to obtain pre-acquisition information corresponding to the resource acquisition request from the blockchain network.

In step 304, the target resource returned by the first server side is received, the target resource is returned by the first server side when the pre-acquisition information indicates that there is a resource pre-acquisition transaction corresponding to the first consumer terminal and the target resource stored in the blockchain ledger of the blockchain network.

In one implementation, the method further includes:
initiating a resource pre-acquisition transaction to the blockchain network; or,
initiating a resource pre-acquisition request for the target resource to the first server side, for the first server side to initiate the resource pre-acquisition transaction to the blockchain network in response to the resource pre-acquisition request.

In one implementation, initiating the acquisition request includes:
initiating the resource acquisition request upon determining that the resource pre-acquisition transaction has been successfully stored in the blockchain ledger; or,
initiating the resource acquisition request at the same time when initiating the resource pre-acquisition request or the resource pre-acquisition transaction, the resource acquisition request is responded by the first server side upon determining that the resource pre-acquisition transaction has been successfully stored in the blockchain ledger.

In one implementation, the first consumer terminal includes:
a first consumer client corresponding to the first server side; or,
a second server side different from the first server side, and in this case, the resource pre-acquisition transaction or the resource pre-acquisition request is initiated by the second server side in response to a resource consumption request initiated by a second consumer client for the target resource.

Figure 4:
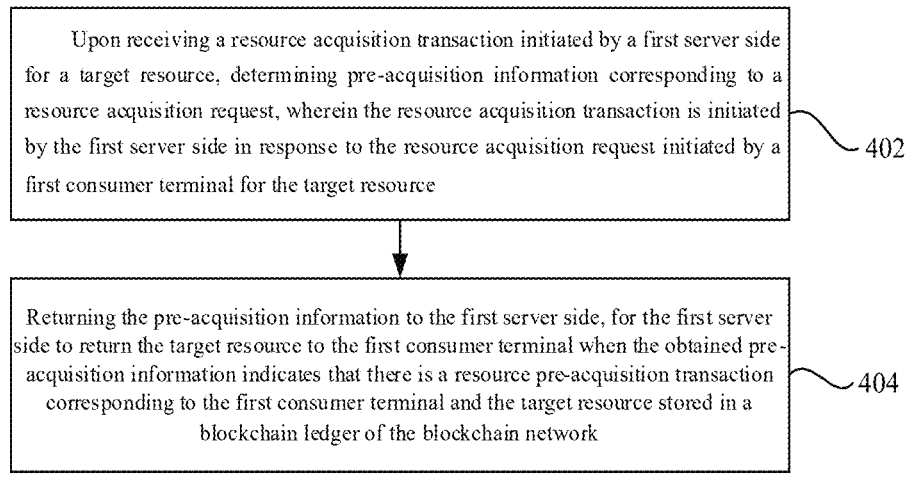
FIG. 4 is a flowchart of another resource distribution method illustrated according to an embodiment of the present disclosure.

FIG. 4 is a flowchart of another resource distribution method according to an exemplary embodiment of the present disclosure. As shown in FIG. 4, the method is applied to any blockchain node in a blockchain network, and may include the following steps 402-404.

In step 402, upon receiving a resource acquisition transaction initiated by the first server side for the target resource, the pre-acquisition information corresponding to the resource acquisition request is determined, the resource acquisition transaction is initiated by the first server side in response to the resource acquisition request initiated by the first consumer terminal for the target resource.

In step 404, the pre-acquisition information is returned to the first server side for the first server side to return the target resource to the first consumer terminal when the pre-acquisition information indicates that there is a resource pre-acquisition transaction corresponding to the first consumer terminal and the target resource stored in the blockchain ledger of the blockchain network.

In one implementation, the method further includes:
participating in a consensus process for the resource pre-acquisition transaction initiated by the first server side or the first consumer terminal upon receipt of the resource pre-acquisition transaction;
when the resource pre-acquisition transaction passes consensus, storing the resource pre-acquisition transaction in the blockchain ledger of the blockchain network maintained by the blockchain network.

The specific implementations of the methods described in FIGS. 3 and 4 can be found in the detailed description of the above embodiments, which will not be repeated herein.

Figure 5:
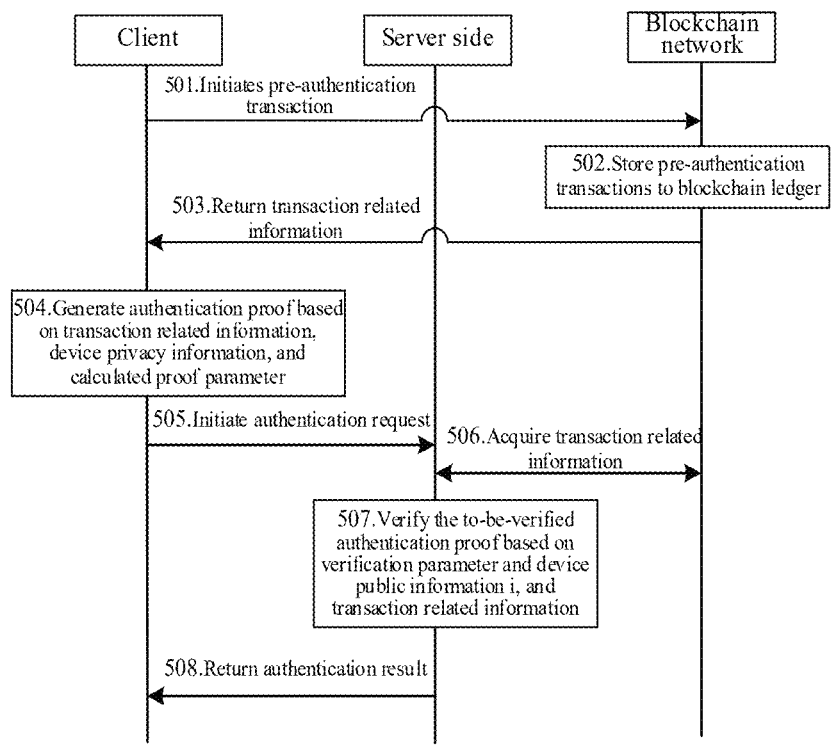
FIG. 5 is a flowchart of a consumer terminal authentication method illustrated according to an embodiment of the present disclosure.

FIG. 5 is a flowchart of a client authentication method illustrated in an exemplary embodiment of the present disclosure. As shown in FIG. 5, this method can include the following steps 501-508. Firstly, it should be noted that the server described in this method can be the first server side or the second server side, and the client described in this method can be any corresponding server side of the server side. Taking the first server side as an example, the client can be the first consumer client or the first production client corresponding to the first server side, which is not limited by the embodiments of the present disclosure.

In step 501, the client initiates a pre-authentication transaction to the blockchain network.

Before starting verification, the client can first determine device privacy information and device public information of the first consumer device they are on. Here, the device privacy information can be an encryption algorithm, TEE parameters, device private key, and other information of the first consumer device. The device public information refers to the public information in the ZKP algorithm, such as the device type, device number (such as IMEI, MSN), MAC address, device public key, etc., of the first consumer device. The embodiments of the present disclosure do not limit this.

Then, the first consumer terminal can calculate the corresponding proof and the authentication parameter based on the predefined (such as those recorded in the installation file of the first consumer terminal) ZKP algorithm polynomial, based on the device privacy information and the device public information mentioned.

Afterwards, the client can generate a pre-authentication transaction based on a first identifier thereof and the authentication parameter, and initiate the transaction to the blockchain node connected thereto. The process of generating and initiating the pre-authentication transaction can be achieved through the deployment of a chain machine SDK in the client.

In step 502, the blockchain network stores pre-authentication transactions in its own blockchain ledger.

After receiving the pre-authentication transaction, the blockchain node connected to the client can synchronize the transaction to other blockchain nodes based on the synchronization mechanism of the blockchain network, such that each blockchain node can participate in the consensus process for the pre-authentication transaction. In the case of consensus approval, the transaction will be packaged into blocks by each blockchain node and stored in the blockchain ledger of the blockchain network maintained by itself.

In step 503, the blockchain network returns transaction related information of the pre-authentication transaction block to the client.

In the case where the pre-authentication transaction is successfully stored in the blockchain ledger, the blockchain network can return a corresponding storage success message to the client. The message can contain transaction related information of the pre-authentication transaction. The transaction related information can include pre-authentication transaction information (such as transaction hash, transaction initiator, transaction initiation time, contract address of the smart contract called by the transaction, transaction receipt, etc.) and block information (such as block hash, block height, etc.) of the block to which the transaction belongs.

However, in the case where the pre-authentication information has not been successfully stored in the blockchain ledger, the blockchain network can return a storage failure message to the client, which will not be elaborated herein.

It should be noted that steps 501-503 are exemplary. In fact, in the absence of a connection between the client and the blockchain nodes in the blockchain network, the client can also initiate a pre-authentication request to the server side, and the server side can respond to this request and initiate a pre-authentication transaction to the blockchain network. Correspondingly, the blockchain network can forward the storage success message or the storage failure message to the client via the server side.

In step 504, the client generates an authentication proof based on the obtained transaction related information, the device privacy information of the terminal device in which the client is located, and the calculated proof parameter.

By using a zero knowledge proof algorithm to generate an authentication proof using the device privacy information of the terminal device where the client is located, the client can be bound to the terminal device running the client.

In step 505, the client initiates an authentication request to the server side.

The authentication request may include the to-be-verified authentication proof and the device public information of the terminal device. It can be understood that if the client is a normal user used client, the authentication request initiated by the client will carry the authentication proof calculated by the client, that is, the to-be-verified authentication proof is the true authentication proof calculated by the client. However, for the server side, after receiving the authentication request, the server side cannot directly determine the authenticity of the sender of the request. Therefore, it is necessary to verify the authentication proof carried in the request.

In step 506, the server side acquires transaction related information corresponding to the authentication request from the blockchain network.

The server side can request transaction related information corresponding to the authentication request from a blockchain node connected thereto. It can be understood that in the case where the initiator of the received authentication request is the recipient of the transaction related information in step 503, the transaction related information described in steps 503 and 506 should be the same.

In step 507, the server side verifies the to-be-verified authentication proof based on the verification parameter and the device public information included in the pre-authentication transaction, and the transaction related information acquired from the blockchain network.

In the previous step, the client calculates the authentication proof and the specific method of verifying the to-be-verified authentication proof by the server side is determined by the specific implementation of the ZKP algorithm, and the embodiments of the present disclosure do not limit this. It can be understood that if the to-be-verified authentication proof passes verification, it indicates that the client has passed the authentication of the server side. At this time, the server side can record the first identifier of the server side in the consumer terminal list maintained by the server side, thereby completing the authentication process of the client side. After the recording is completed or in the case of authentication failure, corresponding notification messages can be returned to the client for timely notification. However, the token of the client can also be recorded in the consumer terminal list, and the token can be generated based on the authentication proof, which will not be elaborated herein. Based on the consumer terminal list, the server side can query the client ID or token carried in any transaction request initiated by any client (such as resource pre-acquisition request or resource acquisition request) in the list. If the client ID or token is found in the list, it indicates that the client (i.e. the initiator of the request) is a legitimate client, and the server side can start responding to the request; otherwise, the response request can be rejected.

It can be understood that because the generation process of the authentication proof uses the device privacy information of the terminal device, the zero knowledge proof authentication process achieves binding between the client and the terminal device. Through the above methods, the client has been granted the authority to legitimately interact with the server side, ensuring permission control over consumed resources, and reducing the security risk and infringement risk of the resources to be consumed.

In step 508, the server side returns an authentication result to the client.

Afterwards, the server side can return the authentication result for the client to inform the client. Upon completion of authentication, the client, as a legitimate client, can access the server side to use the preset functions provided by the server side.

Figure 6:
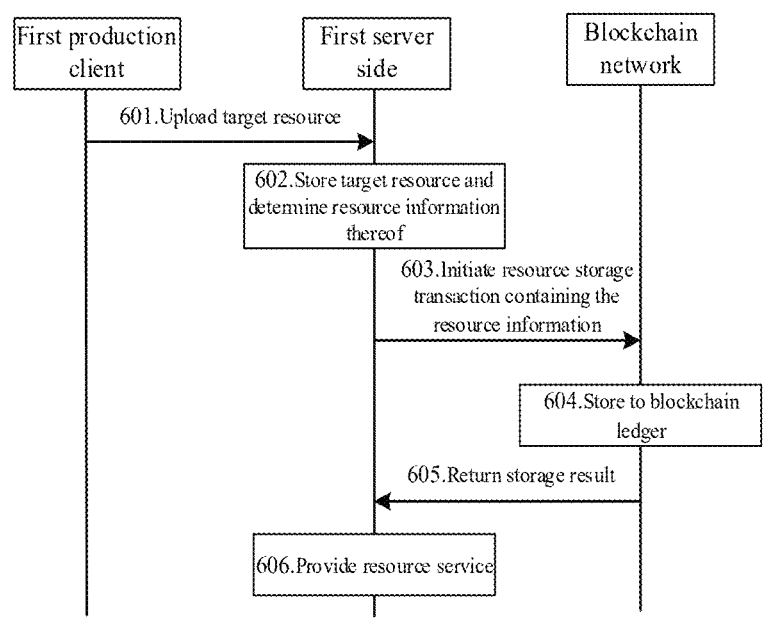
FIG. 6 is a flowchart of a resource storage method illustrated according to an embodiment of the present disclosure.

After the authentication is completed, any client (hereinafter referred to as the first production client) can upload the target resources produced by the client to its corresponding server side (hereinafter referred to as the first server side). FIG. 6 is a flowchart of a resource certification method illustrated in an exemplary embodiment of the present disclosure. As shown in FIG. 6, this method can include the following steps 601-608.

In step 601, the first production client uploads the target resource to the first server side.

The first production client can generate the target resource locally, or it can also obtain the target resource that has already been produced and sent by other devices to the terminal device where the first production client is located. Here, the process of generating the target resource can include selecting, editing materials, etc. Taking videos as an example, users corresponding to the first production client (such as UP hosts, bloggers, etc.) can select the original video as the material, and use the video editing function provided by the first production client or other applications in the terminal device to edit the original video, such as adjusting the sound or screen of the original video, adding subtitle or transcoding the original video. The embodiments of the present disclosure do not limit this.

Here, the target resource uploaded to the first server side is essentially the original resource file of the resource, such as text files, images, audio files, video files, etc.

In step 602, the first server side stores the target resource in a corresponding database and determines resource information of the resource.

After receiving the target resource uploaded by the first production client, on the one hand, the first server side can store the original resource file in a corresponding database, which can be a local database of the server side or a distributed database connected to the server side. The embodiments of the present disclosure do not limit this. On the other hand, the first server side can determine the file size, file hash, format information, play back duration, encryption parameter, and other resource information of the target resource.

In step 603, the first server side initiates a resource storage transaction containing the resource information to the blockchain network.

In step 604, the blockchain network stores the resource storage transaction in a blockchain ledger thereof.

Furthermore, the first server side can initiate a resource storage transaction with the blockchain network. By carrying the resource information of the target resource at the transaction center, the server side can store the resource information onto the chain. Specifically, in the case where each blockchain node in the blockchain network passes the consensus on the resource storage transaction, the resource storage transaction carrying the resource information is packaged into blocks by each blockchain node and stored in the blockchain ledger of the blockchain network maintained by the blockchain network.

In step 605, the blockchain network returns the storage result of the resource storage transaction to the first server side.

In step 606, the first server side provides resource services for the target resource to its corresponding server side.

In the case where the resource storage transaction is successfully stored in the blockchain ledger, the blockchain node connected to the first server side can return the corresponding storage result to the first server side. The storage result can be a storage success message, which can include the block height and block hash of the block to which the resource storage transaction belongs. However, in the case where the resource storage transaction has not been successfully stored in the blockchain ledger, the blockchain network can return a storage failure message to KK, which will not be elaborated herein.

At this point, the upload of the target resource is completed. At this point, the original resource file of the target resource is stored in the corresponding database, and the resource information of the target resource is stored on the chain. Afterwards, the server side can provide resource services for the target resource to its corresponding client based on the stored original resource file and the stored resource information. For example, for the first production client, the server side can provide resource management service for it, such that the production user can manage the target resource uploaded by the production user through this service. For example, for clients other than the first production client (such as consumer clients or other first production clients, etc.), the blockchain network can provide resource consumption service for them, such that other users can consume the uploaded target resources through this service.

Figure 7:
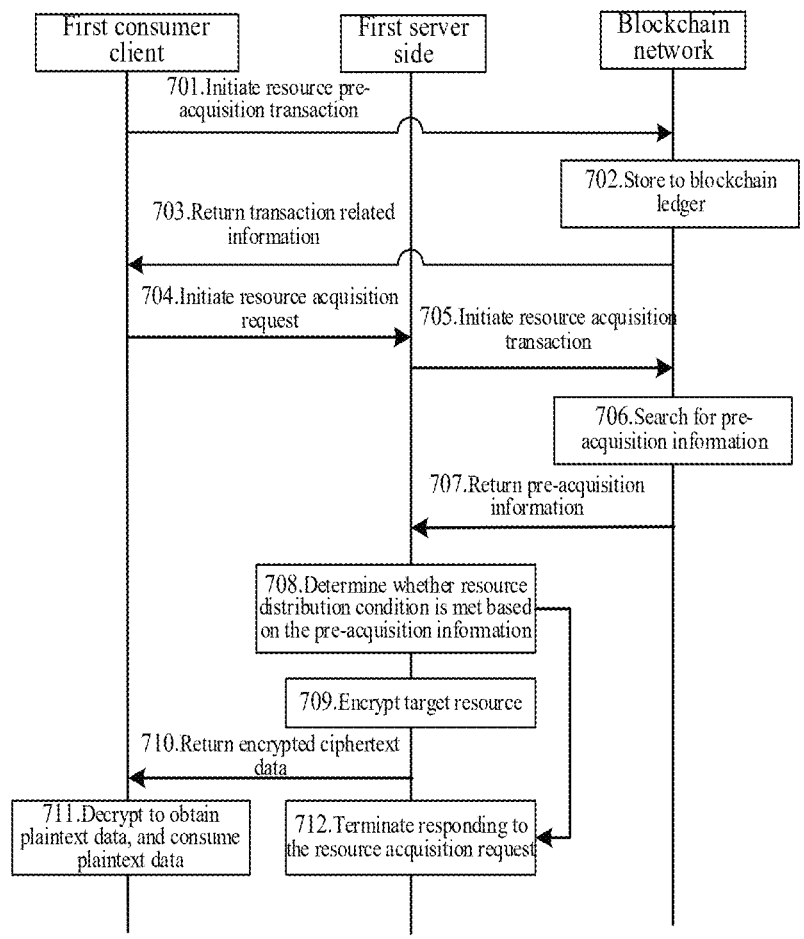
FIG. 7 is a flowchart of a resource distribution method illustrated according to an embodiment of the present disclosure.

During the process of consuming the target resource by any consumer client, the first server side needs to distribute the resource to the consumer client. The following is an explanation of a process of the first consumer client (which can be any consumer client corresponding to the first server side) requesting to obtain the target resource from the first server side, in conjunction with FIG. 7. FIG. 7 is a flowchart of a resource distribution method illustrated in an exemplary embodiment of the present disclosure. As shown in FIG. 7, this method can include the following steps 701-712.

In step 701, the first consumer client initiates to the blockchain network a resource pre-acquisition transaction for the target resource.

In step 702, the blockchain network stores the resource pre-acquisition transaction in a blockchain ledger of the blockchain network.

The resource pre-acquisition transaction may include resource information of the to-be-acquired target resource, which may include a file size, a file hash, format information, playback time, encryption parameter, etc. Correspondingly, each blockchain node in the blockchain network can initiate a consensus on the resource pre-acquisition transaction. After the consensus is passed, the transaction will be packaged into blocks by each blockchain node and stored in its own maintained blockchain ledger of the blockchain network.

In step 703, the blockchain network returns transaction related information of the resource pre-acquisition transaction to the first server side.

In the case where the resource pre-acquisition transaction is successfully stored in the blockchain ledger, the blockchain network can return a corresponding storage success message to the first consumer client, and the message can contain transaction related information of the pre-authentication transaction. The transaction related information can include transaction information of the pre-authentication transaction (such as transaction hash, transaction initiator, transaction initiation time, contract address of the smart contract called by the transaction, transaction receipt, etc.) and block information (such as block hash, block height, etc.) of the block to which the transaction belongs. However, in the case where the pre-authentication information has not been successfully stored in the blockchain ledger, the blockchain network can also return a storage failure message to the first consumer client, which will not be elaborated herein.

It should be noted that steps 701-703 are exemplary. In fact, when a connection between the client and the blockchain nodes in the blockchain network has not been established, the first consumer client can also initiate a resource pre-acquisition request to the first server side, and the first server side responds to the request by initiating a corresponding resource pre-acquisition transaction to the blockchain network. After the pre-acquisition transaction of the storage resource is completed, the blockchain network can forward a storage success message or a storage failure message to the first consumer client through the server side, which will not be elaborated herein.

In step 704, the first consumer client initiates to the first server side a resource acquisition request for the target resource.

In one embodiment, upon obtaining the storage success message, the first consumer client can initiate to the first server side a resource acquisition request for the target resource at an appropriate time. Correspondingly, the first server side can respond to the request and initiate to the blockchain network a resource acquisition transaction for the target resource. Here, the resource acquisition request and the resource acquisition transaction can carry the received transaction related information.

In another embodiment, in order to reduce the time consumption of step 703, the first consumer client can also initiate the resource acquisition request to the first server side while initiating the resource pre-acquisition transaction to the blockchain network (in this case, the request can include the resource identifier of the target resource, without the need to include the transaction related information), such that the first server side can trigger upon receiving the storage success message returned by the blockchain network, to start responding to the resource acquisition request without returning the block information to the first consumer client and waiting for the resource acquisition request initiated based on this information, thereby improving the response speed to the resource acquisition request to a certain extent.

It should also be noted that the resource pre-acquisition request and the resource acquisition request initiated by the first consumer client can carry a first identifier of the first consumer client, such that the first server side can search for the first identifier in a locally maintained list of consumer clients, and determine whether the first consumer client is a legitimate client that has completed authentication based on the query results (i.e. whether the first identifier is found in the list), thus effectively avoiding the first consumer client that has not passed the first server side authentication from obtaining the target resource, and reducing potential infringement risks.

Corresponding to the resource acquisition transaction, blockchain nodes in the blockchain network can search for the resource pre-acquisition transaction in the blockchain ledger, and further determine the corresponding pre-acquisition information when the transaction is found in the ledger, and then return the information to the first server side.

In step 705, the first server side initiates to the blockchain network a resource acquisition transaction for the target resource.

In step 706, the blockchain network searches for pre-acquisition information corresponding to the resource acquisition transaction in the blockchain ledger.

In step 707, the blockchain network returns the pre-acquisition information to the first server side.

In response to the target resource, the first server side can initiate a resource acquisition transaction to the blockchain network, which can include the resource identifier of the target resource and relevant transaction information. However, the blockchain network may also receive resource acquisition requests initiated by other servers or clients for the target resource. Therefore, the blockchain network can determine the authenticity of the resource acquisition request by verifying whether there are resource pre-acquisition transactions corresponding to the resource acquisition request stored in the blockchain ledger.

When there is indeed a resource pre-acquisition transaction corresponding to the resource acquisition request stored in the blockchain ledger of the blockchain network, the blockchain network can determine that the resource acquisition request has passed verification, and at this time, the pre-acquisition information of the resource pre-acquisition transaction can be returned to the first server side.

In step 708, the first server side determines whether a resource distribution condition is met based on the pre-acquisition information.

After obtaining the pre-acquisition information, the first server side can further determine whether the resource distribution condition of "pre-acquisition transactions corresponding to the first consumer client and the target resource are stored in the blockchain ledger maintained by the blockchain network" is met based on the information, and if the condition is met, it proceeds to step 709. If the condition is not met, it proceeds to step 712.

In addition, the first server side can also determine whether the condition "the current time is within the validity period of the resource pre-acquisition transaction" is met based on the valid time information of the resource pre-acquisition transaction. At this point, the first server side can proceed to step 709 if both of the above conditions are met, and to step 712 if either of the above conditions is not met. Through this method, it can further ensure that the resource acquisition request responded to by the first server side is a valid request. The specific determination methods for the above two conditions can be found in the description of the above embodiments, which will not be repeated herein.

In step 709, the first server side encrypts the target resource using an encryption parameter.

In step 710, the first server side returns the encrypted ciphertext data to the first consumer client.

In step 711, the first consumer client decrypts the plaintext data of the target resource using an encryption parameter, and then consumes the plaintext data.

In order to enhance the privacy of the transmission process of the target resource and avoid data leakage during the transmission process, the first server side can use an encryption parameter to encrypt the target resource into ciphertext data and transmit the ciphertext data to the first consumer client. The encryption parameter can be included in the resource acquisition request, that is, the first consumer terminal server provides the encryption parameter to the first server side. In the case where the encryption parameter include a first key, the first server side can use the first key to encrypt all or part of frame images of a video. Alternatively, in the case where the encryption parameter includes an encryption modulus and a second key, the first server side can determine key frames in each video frame based on the encryption modulus and the frame number of each video frame in the video, and encrypt the key frames using the first key. The specific encryption method can be found in the detailed description of the above embodiments, which will not be elaborated herein.

It can be understood that since the encryption parameter is provided by the first consumer client, the first consumer client can maintain a decryption parameter corresponding to the encryption parameter and, upon receiving the ciphertext data mentioned above, use the decryption parameter to decrypt the ciphertext data to obtain the target resource in plaintext form, and further consume the target resource in plaintext form. This method can ensure the private transmission of the target resource, prevent the plaintext of the target resource from being leaked to illegitimate consumer clients, and improve the security of the target resource transmission process.

In step 712, the first server side terminates responding to the resource acquisition request.

In the case where the pre-acquisition information indicates that the resource distribution conditions are not met, the first server side can terminate the response to the resource acquisition request, such as directly discarding the request, recording the request, or initiating an alert to a preset management party for the request. Through this method, it can effectively avoid distributing target resources to clients without legitimate access rights, and improve the security of the target resource distribution process.

It can be seen that this method initiates a blockchain transaction to the blockchain network, and stores distribution records related to the process of the first consumer client obtaining target resources from the first server side on the blockchain, thereby achieving reliable storage of distribution records. Based on the above transactions that have been stored, any distribution process of the target resource can be traced, which helps to improve the control ability of the target resource and to some extent reduce the security risks and infringement hazards of the resource distribution process.

Figure 8:
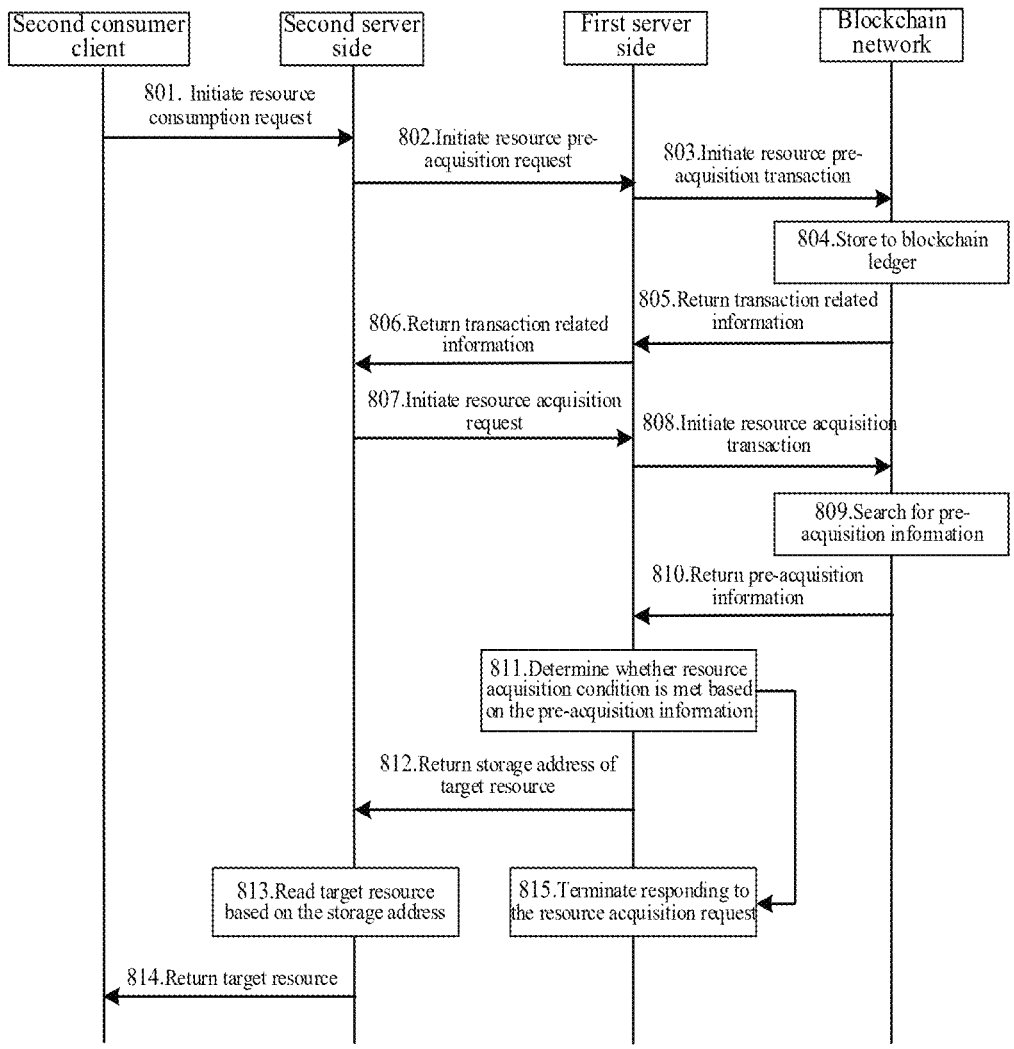
FIG. 8 is a flowchart of a resource forwarding method illustrated according to an embodiment of the present disclosure.

In addition to having the above resource distribution function, the first server side can also achieve resource forwarding function through cooperation with the second server side, allowing the second consumer client to request target resources from the first server side for consumption through its corresponding second server side. FIG. 8 is a flowchart of a resource forwarding method illustrated in an exemplary embodiment of the present disclosure. As shown in FIG. 8, this method can include the following steps 801-815.

In step 801, the second consumer client initiates to the second server side a resource consumption request for the target resource.

The second consumer client can be a legitimate client pre-authentication to the second server side. When a user of the second consumer client wants to consume the target resource, the second consumer client can initiate a resource message request to its corresponding second server side for the resource. However, the second server side can obtain a resource list from the first server side in advance and provide it to the second consumer client, such that the client can display it to the user and facilitate the user to select at least one resource of interest as the target resource to be obtained in this method.

In step 802, the consumer client initiates a resource pre-acquisition request to the first server side for the target resource in response to the resource consumption request.

In order to avoid malicious infringement during the acquisition process of the target resource, the second server side can verify the initiator of the resource pre-acquisition request after receiving the request, to determine whether the second consumer client is a legitimate client. The specific verification method can be found in the usage of the consumer terminal list mentioned above, which will not be repeated herein.

After verification is passed, the second server side can trigger the start of responding to resource consumption requests. Firstly, the second server side can initiate to the first server side a resource pre-acquisition request for the target resource, which can carry resource information of the target resource.

In step 803, the first server side initiates to the blockchain network a resource pre-acquisition transaction for the target resource.

In step 804, the blockchain network stores the resource pre-acquisition transaction in blockchain ledger thereof.

In step 805, the blockchain network returns the transaction related information of the pre-acquisition transaction block to the first server side.

The transaction related information described in this method can include transaction information of resource pre-acquisition transactions (such as transaction hash, transaction initiator, transaction initiation time, contract address of the transaction calling the smart contract, transaction receipt, etc.) and block information of the block to which the transaction belongs (such as block hash, block height, etc.).

In step 806, the first server side forwards the transaction related information to the second server side.

The corresponding steps are similar to the above embodiments of the acquisition process and will not be repeated. It should be noted that steps 802-806 are exemplary. In the case where the second server side establishes a connection with a blockchain node in the blockchain network, the second server side can also directly initiate the resource pre-acquisition transaction with the blockchain node, which will not be elaborated herein.

In step 807, the second server side initiates to the first server side a resource acquisition request for the target resource.

In step 808, the first server side initiates to the blockchain network a resource acquisition transaction for the target resource.

In step 809, the blockchain network searches for pre-acquisition information corresponding to the resource-acquisition transaction in the blockchain ledger.

In step 810, the blockchain network returns the pre-acquisition information to the first server side.

The specific process of steps 807-810 is similar to steps 704-707 in the above embodiments and will not be repeated.

In step 811, the first server side determines whether the resource acquisition condition is met based on the pre-acquisition information.

After obtaining the pre-acquisition information, the first server side can further determine whether the resource acquisition condition of "resource pre-acquisition transactions corresponding to the second server side and the target resource are stored in the blockchain ledger maintained by the blockchain network" is met based on this information. In the case where the pre-acquisition information indicates that the resource acquisition condition is met, it is possible to proceed to step 812; otherwise, in the case where the pre-acquisition information indicates that the resource acquisition condition is not met, step 815 can be carried out.

In addition, the first server side can also determine whether the condition "the current time is within the validity period of the resource pre-acquisition transaction" is met based on the valid time information of the resource pre-acquisition transaction. At this point, the first server side can proceed to step 812 if both of the above conditions are met, and to step 815 if either of the above conditions is not met. Through this method, it can further ensure that the resource acquisition request responded to by the first server side is a valid request. The specific determination method for the above two conditions is similar to the resource distribution conditions mentioned above, which can be seen in the description of the above embodiments and will not be repeated here.

In step 812, the first server side returns the storage address of the target resource to the second server side.

In step 813, the second server side reads the target resource from the corresponding storage space based on the storage address.

In step 814, the second server side returns the target resource to the second consumer client.

In step 815, the first server side terminates responding to the resource acquisition request.

The specific implementation methods of steps 812-815 mentioned above can be found in the description of the above embodiments, which will not be repeated herein. In this method, the first and second server sides can correspond to different resource consumption platforms, respectively. This method provides the second client with forwarding function for the resources maintained by the first server side, achieving cross platform consumption of target resources.

Corresponding to the above embodiments of resource distribution methods, the present disclosure also provides embodiments of various resource distribution apparatuses.

An embodiment of the present disclosure provides a resource distribution apparatus applied to a first server side, including one or more processors configured to:
in response to a resource acquisition request initiated by a first consumer terminal for a target resource, obtain pre-acquisition information corresponding to the resource acquisition request from a blockchain network;
when the obtained pre-acquisition information indicates that there is a resource pre-acquisition transaction corresponding to the first consumer terminal and the target resource stored in a blockchain ledger of the blockchain network, return the target resource to the first consumer terminal.

In one embodiment, the first server side maintains a consumer terminal list, which is used to record consumer terminal identifiers of consumer terminals that have been authenticated by the first server side. The processor is configured to:
determine a first identifier of the first consumer terminal carried in the resource acquisition request, and respond to the resource acquisition request when the first identifier is recorded in the consumer terminal list.

In one embodiment, the processor is configured to:
in response to a pre-authentication request initiated by the first consumer terminal, initiate to the blockchain network a pre-authentication transaction containing the first identifier; and, upon determining that the pre-authentication transaction has been successfully stored in the blockchain ledger, return transaction related information of the pre-authentication transaction to the first consumer terminal to trigger the first consumer terminal to calculate an authentication proof of a zero knowledge proof algorithm based on a proof parameter, a device privacy information of a device where the first consumer terminal is located, and the transaction related information;
determine the transaction related information of the pre-authentication transaction in response to the authentication request initiated by the first consumer terminal, and verify an to-be-verified authentication proof carried in the authentication request based on a verification parameter, device public information of the device where the first consumer terminal is located, and the transaction related information; the proof parameter and the verification parameter being calculated by the first consumer terminal based on the device privacy information and the device public information;
if the to-be-verified authentication proof has passed the verification, record the first identifier in the consumer terminal list.

In one embodiment, the resource pre-acquisition transaction is initiated by the first consumer terminal to the blockchain network; or,
The method further includes initiating a resource pre-acquisition transaction to the blockchain network in response to a resource pre-acquisition request initiated by the first consumer terminal for the target resource.

In one embodiment, the processor is configured to:
return the target resource to the first consumer terminal when a current time is within a validity period of the resource pre-acquisition transaction.

In one embodiment, the resource pre-acquisition transaction includes a number of valid blocks, and the processor is configured to:
determine a starting block height of a block to which the resource pre-acquisition transaction belongs and a maximum block height at the current time;
when the maximum block height is not greater than a sum of the starting block height and a number of the valid blocks, determine that the current time is within the validity period of the resource pre-acquisition transaction.

In one embodiment, the processor is configured to:
determine the starting block height carried in the resource acquisition request, the starting block height being returned to the first consumer terminal by the blockchain network after determining that the resource pre-acquisition transaction has been successfully stored in the blockchain ledger; or,
send an initial block summary carried in the resource acquisition request to the blockchain network, and receive the starting block height returned by the blockchain network upon determining that the resource pre-acquisition transaction has been successfully stored in the blockchain ledger, wherein the starting block height is searched out by the blockchain network in the blockchain ledger based on the initial block summary.

In one embodiment, the processor is configured as follows: the resource pre-acquisition transaction is initiated by the first server side in response to a resource pre-acquisition request initiated by the first consumer terminal, the resource pre-acquisition request and the resource acquisition request are initiated simultaneously by the first consumer terminal, and the processor is configured as follows:
receive the pre-acquisition information corresponding to the resource acquisition request returned by the blockchain network upon determining that the resource pre-acquisition transaction has been successfully stored in the blockchain ledger.

In one embodiment, the processor is configured to:
upon receiving the target resource uploaded by the first production terminal, store the target resource and initiate a resource storage transaction containing resource information of the target resource to the blockchain network, for the blockchain network to store the resource storage transaction in the blockchain ledger;
include to-be-verified resource information carried in the resource acquisition request in the resource acquisition transaction and send the resource acquisition transaction to the blockchain network, and return the target resource to the first consumer terminal upon receiving a verification succeeded message returned by the blockchain network, wherein the verification succeeded message is returned by the blockchain network upon determining that the to-be-verified resource information matches the resource information contained in the resource storage transaction.

In one embodiment, the resource acquisition request carries an encrypted parameter, and the processor is configured to:
  encrypt the target resource with the encryption parameter to and return a corresponding ciphertext data to the first consumer terminal.

In one embodiment, the target resource is a video, and the processor is configured to:
  when the encryption parameter includes a first key, encrypt all or part of the video frame images using the first key; or,
  when the encryption parameter includes an encryption modulus and a second key, determine key frames of video frames in the video based on the encryption modulus and a frame number of the video frames in the video, and encrypt the key frame using the first key.

In an embodiment, the resource acquisition request carries format information for indicating a specific data format, and the processor is configured to:
  process an original resource file of the target resource into data to be transmitted in the specific data format, and transmit the data to the first consumer terminal.

In one embodiment, the processor is configured to:
  set a transmission restriction identifier for the target resource, the transmission restriction identifier is used to restrict the first consumer terminal from forwarding the target resource to other consumer terminals.

In one embodiment, the processor is configured to:
  send the target resource to the first consumer terminal over a distributed content distribution network.

In one embodiment, the processor is configured to:
  send the original resource file of the target resource to the first consumer terminal; or,
  send a storage address of the original resource file of the target resource to the first consumer terminal, for the first consumer terminal to download the original resource file based on the storage address.

In one embodiment, the resource pre-acquisition transaction is initiated by the first consumer terminal to the blockchain network; or,
  the method further includes initiating a resource pre-acquisition transaction to the blockchain network in response to a resource pre-acquisition request initiated by the first consumer terminal for the target resource.

In an embodiment, the first consumer terminal includes: a first consumer client corresponding to the first server side; or,
  a second server side different from the first server side, the resource pre-acquisition transaction or the resource pre-acquisition request is initiated by the second server side in response to a resource consumption request initiated by a second consumer client for the target resource.

The embodiment of the present disclosure provides another resource distribution apparatus, which is applied to a first consumer terminal. The apparatus includes one or more processors, which are configured to:
  initiate a resource acquisition request for a target resource to a first server side to trigger the first server side to obtain pre-acquisition information corresponding to the resource acquisition request from the blockchain network;
  receive the target resource returned by the first server side, which is returned by the first server side when the pre-acquisition information indicates that there is a resource pre-acquisition transaction corresponding to the first consumer terminal and the target resource stored in the blockchain ledger of the blockchain network.

In an embodiment, initiate the resource pre-acquisition transaction to the blockchain network; or,
  the processor is configured to initiate a resource pre-acquisition request for the target resource to the first server side, for the first server side, in response to the resource pre-acquisition request, to initiate the resource pre-acquisition transaction to the blockchain network.

In one embodiment, the processor is configured to:
  initiate the resource acquisition request upon determining that the resource pre-acquisition transaction has been successfully stored in the blockchain ledger; or,
  initiate the resource acquisition request at the same time as initiating the resource pre-acquisition request or the resource pre-acquisition transaction, wherein the resource acquisition request is responded by the first server side upon determining that the resource pre-acquisition transaction has been successfully stored in the blockchain ledger.

In one embodiment, the first consumer terminal includes: a first consumer client corresponding to the first server side; or,
  a second server side different from the first server side, the resource pre-acquisition transaction or resource pre-acquisition request is initiated by the second server side in response to a resource consumption request initiated by a second consumer client for the target resource.

The embodiment of the present disclosure provides another resource distribution apparatus, which is applied to any blockchain node in a blockchain network. The apparatus includes one or more processors, which are configured to:
  upon receiving a resource acquisition transaction initiated by the first server side for the target resource, determine pre-acquisition information corresponding to the resource acquisition request, the resource acquisition transaction is initiated by the first server side in response to a resource acquisition request initiated by the first consumer terminal for the target resource;
  return the pre-acquisition information to the first server side, for the first server side to return the target resource to the first consumer terminal when the obtained pre-acquisition information indicates that there is a resource pre-acquisition transaction corresponding to the first consumer terminal and the target resource stored in the blockchain ledger of the blockchain network.

In one embodiment, the processor is configured to:
  participate in a consensus process for the resource pre-acquisition transaction upon receipt of the resource pre-acquisition transaction initiated by the first server side or the first consumer terminal;
  in the case where the resource pre-acquisition transaction passes consensus, store the resource pre-acquisition transaction in the blockchain ledger of the blockchain network maintained by the network node.

The embodiment of the present disclosure also provides an electronic device, including: a processor; a memory used to store processor executable instructions; wherein the processor is configured to implement the resource distribution method described in any of the above embodiments.

The embodiment of the present disclosure also provides a non-transitory computer-readable storage medium on which a computer program is stored, the program implements the steps in the resource distribution method described in any of the above embodiments when executed by the processor.

Regarding the apparatus in the above embodiment, the specific ways in which each module performs operations have been described in detail in the relevant method embodiments, which will not be elaborated herein.

Figure 9:
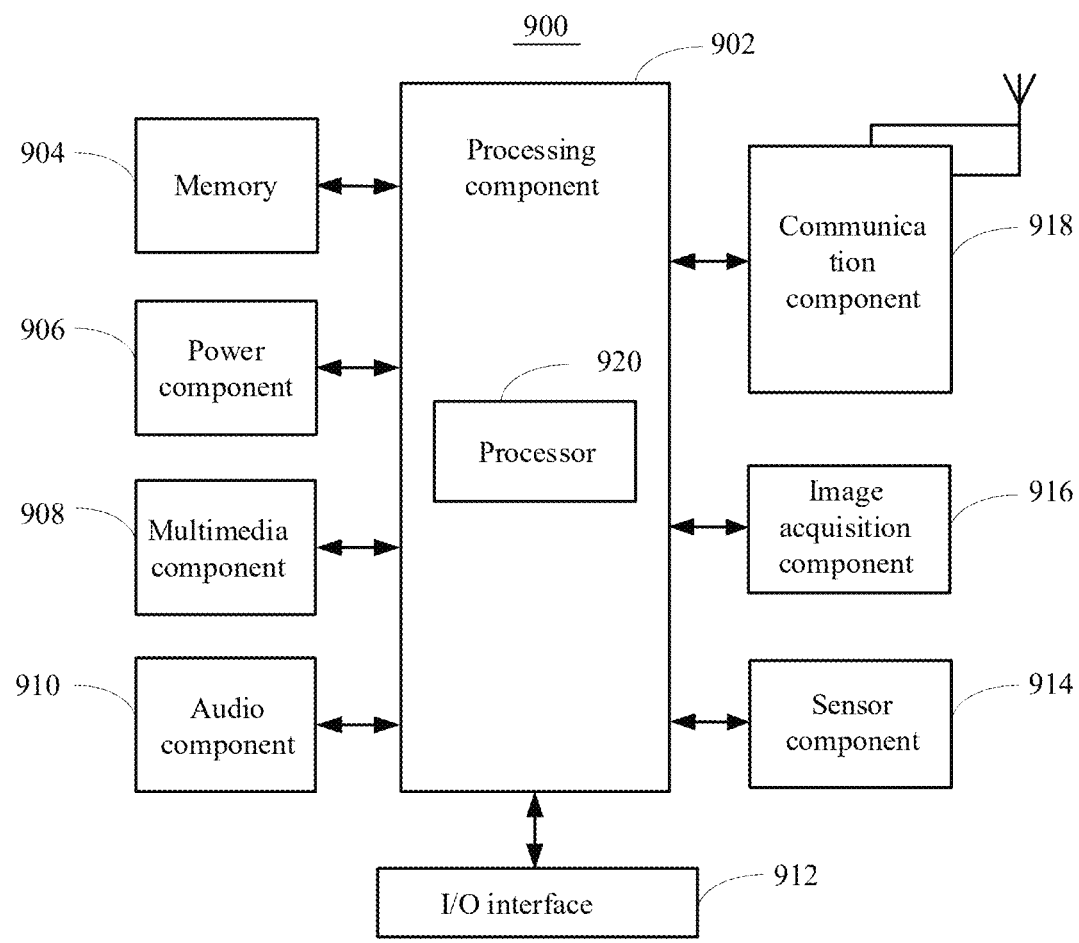
FIG. 9 is a schematic block diagram of a resource distribution apparatus according to an embodiment of the present disclosure.

FIG. 9 s a schematic block diagram of a resource distribution apparatus 900 according to an embodiment of the present disclosure. For example, the apparatus 900 may be a mobile phone, a computer, a digital broadcast terminal, a messaging device, a gaming console, a tablet device, a medical device, exercise equipment, a personal digital assistant or the like.

Referring to FIG. 9, the apparatus 900 may include one or more of the following components: a processing component 902, a memory 904, a power component 906, a multimedia component 908, an audio component 910, an input/output (I/O) interface 912, a sensor component 914 and a communication component 916.

The processing component 902 typically controls overall operations of the apparatus 900, such as the operations associated with display, telephone calls, data communications, camera operations and recording operations. The processing component 902 may include one or more processors 920 to execute instructions to perform all or some of the steps in the above resource distribution methods. Moreover, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, presence or absence of user's contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, 4G LTE, 6G NR or a combination thereof. In one embodiment, the communication component 916 receives a broadcast signal or broadcast associated information from an external broadcast management system via a broadcast channel. In one embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above resource distribution methods.

In an embodiment, there is also provided a non-transitory computer-readable storage medium including instructions, such as included in the memory 904, executable by the processor 920 in the apparatus 900, for performing the above resource distribution methods. For example, the non-transitory computer-readable storage medium may be a ROM, a RAM, a CD-ROM, a magnetic tape, a floppy disc, an optical data storage device or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in this article, relational terms such as first and second are only used to distinguish one entity or operation from another entity or operation, and do not necessarily require or imply any actual relationship or order between these entities or operations. The terms "including", "comprising", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above provides a detailed introduction to the methods and apparatuses provided in the embodiments of the present disclosure. Specific examples are applied in this article to explain the principles and implementations of the present disclosure. The explanations of the above embodiments are only used to help understand the methods and core ideas of the present disclosure; Meanwhile, for ordinary skilled in the art, there may be changes in specific implementations and application scope based on the ideas of the present disclosure. Accordingly, the content of this specification should not be understood as a limitation of the present disclosure.

What is claimed is:

1. A method, comprising:
   in response to a resource acquisition request initiated by a first consumer terminal for a target resource, obtaining, from a blockchain network, pre-acquisition information corresponding to the resource acquisition request;
   in response to the pre-acquisition information indicating that there is a resource pre-acquisition transaction corresponding to the first consumer terminal and the target resource being stored in a blockchain ledger of the blockchain network, returning the target resource to the first consumer terminal;
   wherein the resource pre-acquisition transaction is initiated in response to a resource pre-acquisition request initiated by the first consumer terminal, wherein the resource pre-acquisition request and the resource acquisition request are simultaneously initiated by the first consumer terminal, and wherein obtaining the pre-acquisition information corresponding to the resource acquisition request from the blockchain network comprises:
   receiving the pre-acquisition information corresponding to the resource acquisition request returned by the blockchain network upon determining that the resource pre-acquisition transaction has been successfully stored in the blockchain ledger.

2. The method of claim 1, wherein a first server maintains a consumer terminal list, the consumer terminal list is used to record consumer terminal identifiers of consumer terminals that have been authenticated by the first server, responding to the resource acquisition request, further comprising:
   in response to a first identifier of the first consumer terminal from a consumer terminal list, and responding to the resource acquisition request;
   wherein responding to the resource acquisition request comprises:
   returning the target resource to the first consumer terminal in response to determining that the pre-acquisition transaction corresponding to the first consumer terminal and the target resource is stored in the blockchain ledger maintained by the blockchain network.

3. The method of claim 2, further comprising:
   initiating to the blockchain network a pre-authentication transaction containing the first identifier in response to the pre-authentication request; and, upon determining that the pre-authentication transaction has been successfully stored in the blockchain ledger, returning transaction related information of the pre-authentication transaction to the first consumer terminal, to trigger the first consumer terminal to calculate an authentication proof of a zero knowledge proof algorithm based on a proof parameter, device privacy information of a device where the first consumer terminal is located, and the transaction related information;
   determining the transaction related information of the pre-authentication transaction in response to the authentication request initiated by the first consumer terminal, and verifying the authentication proof based on a verification parameter, device public information of the device where the first consumer terminal is located, and the transaction related information; wherein the proof parameter and the verification parameter are calculated by the first consumer terminal based on the device privacy information and the device public information;
   in response to that the authentication proof being verified, recording the first identifier in a consumer terminal list.

4. The method of claim 1, comprising: initiating the resource pre-acquisition transaction to the blockchain network using the first consumer terminal, or initiating the resource pre-acquisition transaction to the blockchain network in response to the resource pre-acquisition request initiated by the first consumer terminal.

5. The method of claim 1, wherein returning the target resource to the first consumer terminal comprises:
   determining that a current time is within a validity period of the resource pre-acquisition transaction;
   returning the target resource to the first consumer terminal in response to that the current time being within the validity period.

6. The method of claim 5, wherein the resource pre-acquisition transaction comprises a number of valid blocks, and determining that the current time is within the validity period of the resource pre-acquisition transaction comprises:
    determining a starting block height of a block to which the resource pre-acquisition transaction belongs and a maximum block height at the current time;
    in response to that the maximum block height being not greater than a sum of the starting block height and the number of the valid blocks, determining that the current time is within the validity period of the resource pre-acquisition transaction.

7. The method of claim 6, wherein determining the starting block height of the block comprises:
    determining the starting block height carried in the resource acquisition request, the starting block height being returned to the first consumer terminal by the blockchain network after determining that the resource pre-acquisition transaction has been successfully stored in the blockchain ledger; or,
    sending an initial block summary carried in the resource acquisition request to the blockchain network, and receiving the starting block height returned by the blockchain network when the blockchain network determining that the resource pre-acquisition transaction has been successfully stored in the blockchain ledger, wherein the starting block height is retrieved by the blockchain network in the blockchain ledger based on the initial block summary.

8. The method of claim 1, further comprising:
    upon receiving the target resource, storing the target resource and initiating to the blockchain network a resource storage transaction containing resource information of the target resource, for the blockchain network to store the resource storage transaction in the blockchain ledger;
    returning the target resource to the first consumer terminal comprises: including to-be-verified resource information carried in the resource acquisition request in the resource acquisition transaction and sending the resource acquisition transaction to the blockchain network, and returning the target resource to the first consumer terminal upon receiving a verification succeeded message returned by the blockchain network, wherein the verification succeeded message is returned by the blockchain network upon determining that the to-be-verified resource information matches the resource information contained in the resource storage transaction.

9. The method of claim 1, wherein the resource acquisition request carries an encrypted parameter, and returning the target resource to the first consumer terminal comprises:
    encrypting the target resource using the encryption parameter into ciphertext data and returning the ciphertext data to the first consumer terminal.

10. The method of claim 9, wherein the target resource is a video, and encrypting the target resource using the encryption parameter comprises:
    encrypting all or part of frame images of the video using a first key in the encryption parameter; or,
    determining key frames of the video frames of the video based on an encryption modulus in the encryption parameter and a frame number of the video frames of the video, and encrypting the key frames using a second key in the encryption parameter.

11. The method of claim 1, wherein the resource acquisition request carries format information for indicating a specific data format, and returning the target resource to the first consumer terminal comprises:
    processing an original resource file of the target resource into data to be transmitted in the specific data format, and transmitting the data to the first consumer terminal.

12. The method of claim 1, further comprising:
    setting at least one permission identifier for the target resource, wherein a value of the permission identifier indicates a preset operation that the first consumer terminal is allowed to implement for the target resource.

13. The method of claim 1, wherein returning the target resource to the first consumer terminal comprises:
    returning the target resource to the first consumer terminal over a distributed content distribution network.

14. The method of claim 1, wherein returning the target resource to the first consumer terminal comprises:
    sending an original resource file of the target resource to the first consumer terminal; or,
    sending a storage address of the original resource file of the target resource to the first consumer terminal, for the first consumer terminal to download the original resource file based on the storage address.

15. A method, comprising:
    initiating to a first server a resource acquisition request for a target resource, to trigger the first server to obtain pre-acquisition information corresponding to the resource acquisition request from a blockchain network;
    receiving the target resource returned by the first server, in response to the pre-acquisition information indicating that there is a resource pre-acquisition transactions corresponding to a first consumer terminal and the target resource being stored in a blockchain ledger of the blockchain network;
    initiating to the first server a resource pre-acquisition request for the target resource, causing the first server to initiate the resource pre-acquisition transaction to the blockchain network;
    initiating the resource acquisition request at the same time as initiating the resource pre-acquisition request;
    wherein the resource acquisition request is responded by the first server upon determining that the resource pre-acquisition transaction has been successfully stored in the blockchain ledger, the response by the first sever comprises: receiving, by the first server, the pre-acquisition information corresponding to the resource acquisition request returned by the blockchain network upon determining that the resource pre-acquisition transaction has been successfully stored in the blockchain ledger.

16. The method of claim 15, further comprising:
    initiating the resource pre-acquisition transaction to the blockchain network.

17. The method of claim 16, wherein initiating the resource acquisition request, comprises:
    initiating the resource acquisition request upon determining that the resource pre-acquisition transaction has been successfully stored in the blockchain ledger; or,
    initiating the resource acquisition request at the same time as initiating the resource pre-acquisition transaction.

18. A non-transitory computer-readable storage medium on which a computer program is stored, wherein when the program is executed by a processor, the processor is configured to perform operations comprising:
    in response to a resource acquisition request initiated by a first consumer terminal for a target resource, obtaining, from a blockchain network, pre-acquisition information corresponding to the resource acquisition request;

in response to the pre-acquisition information indicating that there is a resource pre-acquisition transaction corresponding to the first consumer terminal and the target resource being stored in a blockchain ledger of the blockchain network, returning the target resource to the first consumer terminal;

wherein the resource pre-acquisition transaction is initiated in response to a resource pre-acquisition request initiated by the first consumer terminal, wherein the resource pre-acquisition request and the resource acquisition request are simultaneously initiated by the first consumer terminal, and wherein obtaining the pre-acquisition information corresponding to the resource acquisition request from the blockchain network comprises:

receiving the pre-acquisition information corresponding to the resource acquisition request returned by the blockchain network upon determining that the resource pre-acquisition transaction has been successfully stored in the blockchain ledger.

\* \* \* \* \*